(12) United States Patent
Nakamura

(10) Patent No.: US 12,528,128 B2
(45) Date of Patent: Jan. 20, 2026

(54) DRILL

(71) Applicant: Sumitomo Electric Hardmetal Corp., Itami (JP)

(72) Inventor: Naohiro Nakamura, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 529 days.

(21) Appl. No.: 18/021,179

(22) PCT Filed: Jun. 15, 2022

(86) PCT No.: PCT/JP2022/023988
§ 371 (c)(1),
(2) Date: Feb. 14, 2023

(87) PCT Pub. No.: WO2023/243004
PCT Pub. Date: Dec. 21, 2023

(65) Prior Publication Data
US 2024/0261878 A1    Aug. 8, 2024

(51) Int. Cl.
*B23B 51/02*    (2006.01)

(52) U.S. Cl.
CPC .......... *B23B 51/02* (2013.01); *B23B 2251/04* (2013.01); *B23B 2251/082* (2013.01); *B23B 2251/182* (2022.01); *B23B 2251/40* (2013.01)

(58) Field of Classification Search
CPC ................ B23B 51/02; B23B 2251/04; B23B 2251/082; B23B 2251/241; B23B 2251/406; B23B 2251/40; B23B 2251/182

See application file for complete search history.

(56) References Cited

U.S. PATENT DOCUMENTS

| | | | | |
|---|---|---|---|---|
| 2,936,658 | A * | 5/1960 | Riley | B23B 51/02 408/230 |
| 5,716,172 | A * | 2/1998 | Nakamura | B23B 51/02 408/230 |
| 5,931,615 | A * | 8/1999 | Wiker | B23B 51/02 408/229 |
| 8,292,555 | B2 * | 10/2012 | Shaffer | B23B 51/02 408/230 |
| 8,579,557 | B2 * | 11/2013 | Arai | B24B 3/32 408/230 |

(Continued)

FOREIGN PATENT DOCUMENTS

| | | | | |
|---|---|---|---|---|
| DE | 102019202396 | A1 * | 2/2020 | ............. B23B 51/00 |
| EP | 3175943 | A1 * | 6/2017 | ............. B23B 51/02 |

(Continued)

*Primary Examiner* — Nicole N Ramos
(74) *Attorney, Agent, or Firm* — XSENSUS LLP

(57) ABSTRACT

A drill has a helical flute surface, a flank face, and a thinning face. A ridgeline between the thinning face and the flank face constitutes a thinning cutting edge. The thinning cutting edge has a curved thinning cutting edge portion and a straight thinning cutting edge portion. The curved thinning cutting edge portion protrudes forward in the rotation direction. The straight thinning cutting edge portion is contiguous to the curved thinning cutting edge portion. The curved thinning cutting edge portion has a first end portion and a second end portion. The first end portion is a boundary between the curved thinning cutting edge portion and the straight thinning cutting edge portion.

4 Claims, 19 Drawing Sheets

(56) References Cited

U.S. PATENT DOCUMENTS

| | | | |
|---|---|---|---|
| 10,413,976 B2 * | 9/2019 | Ogawa | B23B 51/02 |
| 2008/0089753 A1 | 4/2008 | Takikawa | |
| 2008/0298918 A1 * | 12/2008 | Brink | B23B 51/02 |
| | | | 408/230 |
| 2011/0170974 A1 | 7/2011 | Masuda | |
| 2012/0201619 A1 * | 8/2012 | Olsson | B24B 3/32 |
| | | | 408/230 |
| 2018/0236568 A1 | 8/2018 | Yamamoto et al. | |

FOREIGN PATENT DOCUMENTS

| | | | | |
|---|---|---|---|---|
| JP | 2008-93805 A | 4/2008 | | |
| JP | 2014-166660 A | 9/2014 | | |
| JP | 2017-42879 A | 3/2017 | | |
| JP | 2019-171493 A | 10/2019 | | |
| JP | 2020-23051 A | 2/2020 | | |
| JP | 2021-88007 A | 6/2021 | | |
| KR | 20190016714 A | * | 2/2019 | B23B 51/06 |
| WO | 2010/038279 A1 | 4/2010 | | |

* cited by examiner

DRILL

CROSS-REFERENCE TO RELATED APPLICATION

The present application is based on PCT filing PCT/JP2022/023988, filed Jun. 15, 2022, the entire contents of which are incorporated herein by reference.

TECHNICAL FIELD

The present disclosure relates to a drill.

BACKGROUND ART

Japanese Patent Laying-Open No. 2008-093805 (PTL 1) describes a drill having a thinning cutting edge.

CITATION LIST

Patent Literature

PTL 1: Japanese Patent Laying-Open No. 2008-093805

SUMMARY OF INVENTION

A drill according to the present disclosure is a drill rotatable around an axis line, and includes a helical flute surface, a flank face, and a thinning face. The helical flute surface is helically provided around the axis line. The flank face is contiguous to the helical flute surface. The thinning face is contiguous to each of the helical flute surface and the flank face. A ridgeline between the helical flute surface and the flank face constitutes a main cutting edge. A ridgeline between the thinning face and the flank face constitutes a thinning cutting edge. The thinning cutting edge is contiguous to the main cutting edge. As viewed in an axis line direction along the axis line, the thinning cutting edge is close to the axis line with respect to the main cutting edge. The thinning cutting edge includes a curved thinning cutting edge portion and a straight thinning cutting edge portion. The curved thinning cutting edge portion protrudes forward in a rotation direction. The straight thinning cutting edge portion is contiguous to the curved thinning cutting edge portion. The straight thinning cutting edge portion is close to the axis line with respect to the curved thinning cutting edge portion. A first straight line is defined as a straight line passing through the axis line and an outer peripheral position separated rearward in the rotation direction from an outermost peripheral end of the main cutting edge by a predetermined outer peripheral core height. An angle formed by the first straight line and the straight thinning cutting edge portion is 135° or more and 160° or less as viewed in the axis line direction. A length of the straight thinning cutting edge portion is 10% or less of a diameter of the drill as viewed in the axis line direction. An axial rake angle of the straight thinning cutting edge portion is −10° or more and 0° or less in a cross section that is perpendicular to the straight thinning cutting edge portion as viewed in the axis line direction and intersects the straight thinning cutting edge portion. The curved thinning cutting edge portion has a first end portion and a second end portion. The first end portion is a boundary between the curved thinning cutting edge and the straight thinning cutting edge. The second end portion is opposite to the first end portion. An axial rake angle of the curved thinning cutting edge in a cross section perpendicular to a tangent of the curved thinning cutting edge as viewed in the axis line direction is larger in a direction further away from the first end portion. The axial rake angle of the curved thinning cutting edge portion is 5° or more and 20° or less in a cross section that is perpendicular to a tangent of the curved thinning cutting edge portion at the second end portion as viewed in the axis line direction and includes the second end portion. A curvature radius of the curved thinning cutting edge portion is 15% or more and 35% or less of the diameter of the drill as viewed in the axis line direction.

DETAILED DESCRIPTION

Figure 1:
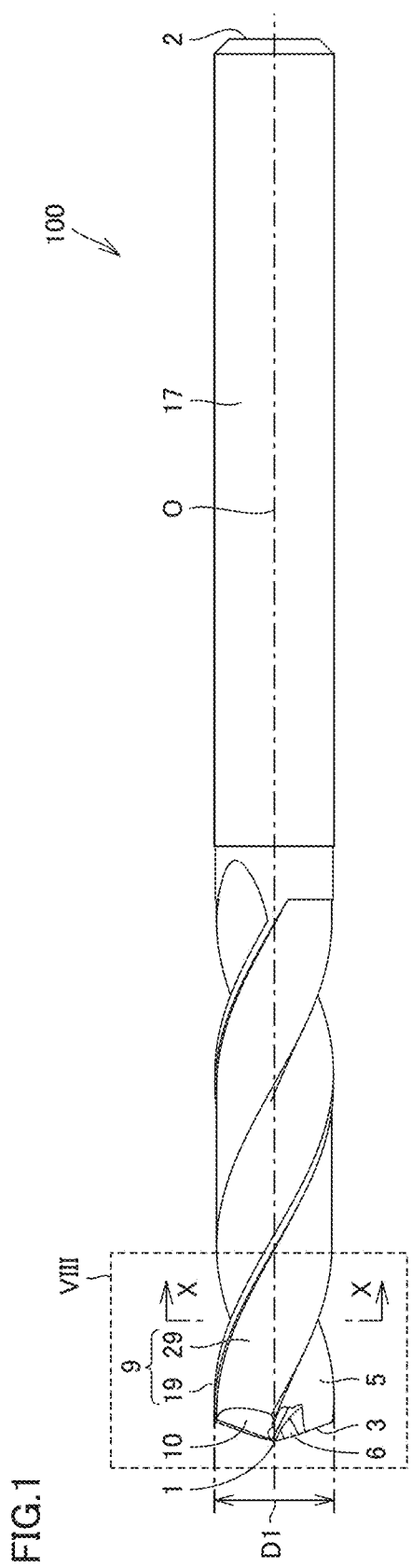
FIG. 1 is a schematic plan view showing a configuration of a drill according to a first embodiment.

Problem to be Solved by the Present Disclosure

It is an object of the present disclosure to provide a drill to suppress melting and adhesion of chips.

Advantageous Effect of the Present Disclosure

According to the present disclosure, a drill can be provided to suppress melting and adhesion of chips.

Summary of Embodiments

First, a summary of embodiments of the present disclosure will be described.

(1) A drill 100 according to the present disclosure is a drill rotatable around an axis line O, and includes a helical flute surface 5, a first flank face 10, and a thinning face 6. Helical flute surface 5 is helically provided around axis line O. First flank face 10 is contiguous to helical flute surface 5. Thinning face 6 is contiguous to each of helical flute surface 5 and first flank face 10. A ridgeline between helical flute surface 5 and first flank face 10 constitutes a main cutting edge 3. A ridgeline between thinning face 6 and first flank face 10 constitutes a thinning cutting edge 4. Thinning cutting edge 4 is contiguous to main cutting edge 3. As viewed in an axis line direction along axis line O, thinning cutting edge 4 is close to axis line O with respect to main cutting edge 3. Thinning cutting edge 4 includes a curved thinning cutting edge portion 43 and a second straight thinning cutting edge portion 42. Curved thinning cutting edge portion 43 protrudes forward in the rotation direction. Second straight thinning cutting edge portion 42 is contiguous to curved thinning cutting edge portion 43. Second straight thinning cutting edge portion 42 is close to axis line O with respect to curved thinning cutting edge portion 43. A first straight line 121 is defined as a straight line passing through axis line O and an outer peripheral position 55 separated rearward in the rotation direction from an outermost peripheral end 59 of main cutting edge 3 by a predetermined outer peripheral core height F. An angle formed by first straight line 121 and second straight thinning cutting edge portion 42 is 135° or more and 160° or less as viewed in the axis line direction. A length of second straight thinning cutting edge portion 42 is 10% or less of a diameter of drill 100 as viewed in the axis line direction. An axial rake angle of second straight thinning cutting edge portion 42 is −10° or more and 0° or less in a cross section that is perpendicular to second straight thinning cutting edge portion 42 as viewed in the axis line direction and intersects second straight thinning cutting edge portion 42. Curved thinning cutting edge portion 43 has a first end portion 51 and a second end portion 52. First end portion 51 is a boundary between curved thinning cutting edge portion 43 and second straight thinning cutting edge portion 42. Second end portion 52 is opposite to first end portion 51. An axial rake angle of curved thinning cutting edge portion 43 in a cross section perpendicular to a tangent of curved thinning cutting edge portion 43 as viewed in the axis line direction is larger in a direction further away from first end portion 51. The axial rake angle of curved thinning cutting edge portion 43 is 5° or more and 20° or less in a cross section that is perpendicular to the tangent of curved thinning cutting edge portion 43 at second end portion 52 as viewed in the axis line direction and includes second end portion 52. A curvature radius of curved thinning cutting edge portion 43 is 15% or more and 35% or less of the diameter of drill 100 as viewed in the axis line direction.

(2) In drill 100 according to (1), thinning face 6 may include a thinning rake face portion 61, a thinning pocket wall portion 63, and an intermediate surface 62. Thinning rake face portion 61 may be contiguous to each of helical flute surface 5 and first flank face 10. Thinning pocket wall portion 63 may be located forward with respect to thinning cutting edge 4 in the rotation direction. Intermediate surface 62 may be contiguous to each of thinning rake face portion 61 and thinning pocket wall portion 63. First flank face 10 may include a first flank face portion 11 and a second flank face portion 12. First flank face portion 11 may be contiguous to each of helical flute surface 5 and thinning face 6. Second flank face portion 12 may be contiguous to first flank face portion 11. Second flank face portion 12 may be located rearward with respect to first flank face portion 11 in the rotation direction. A second straight line 122 is defined as a straight line along a boundary between thinning pocket wall portion 63 and intermediate surface 62. A plan view direction 101 is defined as a direction that is perpendicular to a ridgeline between first flank face portion 11 and second flank face portion 12 and extends inward in a radial direction as viewed in the axis line direction. A third cross section CS3 is defined as a cross section that is perpendicular to second straight line 122 as viewed in plan view direction 101 and intersects the boundary line between thinning pocket wall portion 63 and intermediate surface 62. In third cross section CS3, thinning pocket wall portion 63 may have a curved shape. In third cross section CS3, a curvature radius of thinning pocket wall portion 63 may be 10% or more and 30% or less of the diameter of drill 100. In third cross section CS3, an angle formed by a tangent of thinning rake face portion 61 at a boundary between thinning rake face portion 61 and intermediate surface 62 and a tangent of thinning pocket wall portion 63 at a boundary between thinning pocket wall portion 63 and intermediate surface 62 may be 105° or more and 125° or less.

(3) In drill 100 according to (1) or (2), main cutting edge 3 may include a curved cutting edge portion 31. Curved cutting edge portion 31 may be recessed rearward in the rotation direction. A curvature radius of curved cutting edge portion 31 may be 40% or more and 100% or less of the diameter of drill 100 as viewed in the axis line direction. A maximum distance H between curved cutting edge portion 31 and a third straight line 123 that passes through an outer peripheral end of curved cutting edge portion 31 and is parallel to first straight line 121 may be 0.5% or more and 4% or less of the diameter of drill 100 as viewed in the axis line direction. Thinning face 6 may constitute a first heel 91. First heel 91 may be contiguous to thinning cutting edge 4. First heel 91 may be located forward with respect to thinning cutting edge 4 in the rotation direction. Helical flute surface 5 may constitute a second heel 92. Second heel 92 may be contiguous to first heel 91. Second heel 92 may be located forward with respect to main cutting edge 3 in the rotation direction. Second heel 92 may include a curved portion 95. Curved portion 95 may be recessed forward in the rotation direction. A curvature radius of curved portion 95 may be 15% or more and 25% or less of the diameter of drill 100 as viewed in the axis line direction. In a cross section perpendicular to axis line O, a central angle of helical flute surface 5 may be 0.55 time or more and 1.0 time or less as large as a central angle of a portion other than the helical flute surface.

(4) In drill 100 according to (3), main cutting edge 3 may include a reinforcing cutting edge portion 32. Reinforcing cutting edge portion 32 may be contiguous to curved cutting edge portion 31. Reinforcing cutting edge portion 32 may constitute outermost peripheral end 59. A fourth straight line 124 is defined as a straight line including axis line O and a boundary between curved cutting edge portion 31 and reinforcing cutting edge portion 32 as viewed in the axis line direction. Reinforcing cutting edge portion 32 may be inclined rearward with respect to fourth straight line 124 in the rotation direction as viewed in the axis line direction. An angle formed by reinforcing cutting edge portion 32 and fourth straight line 124 may be 15° or more and 30° or less as viewed in the axis line direction. A length of reinforcing cutting edge portion 32 may be 1% or more and 2% or less of the diameter of drill 100 as viewed in the axis line direction.

Details of Embodiments of the Present Disclosure

Hereinafter, an embodiment of the present disclosure (hereinafter, also referred to as the present embodiment) will be described in detail with reference to figures. It should be noted that in the below-described figures, the same or corresponding portions are denoted by the same reference characters and will not be described repeatedly.

First Embodiment

First, a configuration of a drill 100 according to a first embodiment will be described. FIG. 1 is a schematic plan view showing the configuration of drill 100 according to the first embodiment. As shown in FIG. 1, drill 100 according to the first embodiment mainly has a front end 1, a rear end 2, main cutting edges 3, thinning faces 6, a first flank face 10, outer peripheral surfaces 9, helical flute surfaces 5, and a shank 17. Drill 100 according to the first embodiment is a drill for processing a metal. As shown in FIG. 1, each of outer peripheral surfaces 9 is helically provided around axis line O. Each of helical flute surfaces 5 constitutes a flute. Helical flute surface 5 is helically provided around axis line O. Each of outer peripheral surfaces 9 is contiguous to a helical flute surface 5. Each of main cutting edges 3 is provided at a position close to front end 1 of drill 100.

Thinning face 6 is contiguous to helical flute surface 5. First flank face 10 is contiguous to outer peripheral surface 9. Front end 1 of drill 100 is a portion to face a workpiece. Rear end 2 of drill 100 is a portion to face a tool spindle that rotates drill 100. Shank 17 is a portion to be attached to the tool spindle.

Axis line O passes through front end 1 and rear end 2. A direction along axis line O is an axis line direction. A direction perpendicular to the axis line direction is a radial direction. In the present specification, a direction from front end 1 toward rear end 2 is referred to as "rearward in the axis line direction". On the other hand, a direction from rear end 2 toward front end 1 is referred to as "forward in the axis line direction". In the present specification, a direction that is perpendicular to the axis line direction and that extends toward axis line O is referred to as "inward in the radial direction". On the other hand, a direction that is perpendicular to the axis line direction and that extends away from axis line O is referred to as "outward in the radial direction". Drill 100 is rotatable around axis line O.

Figure 2:
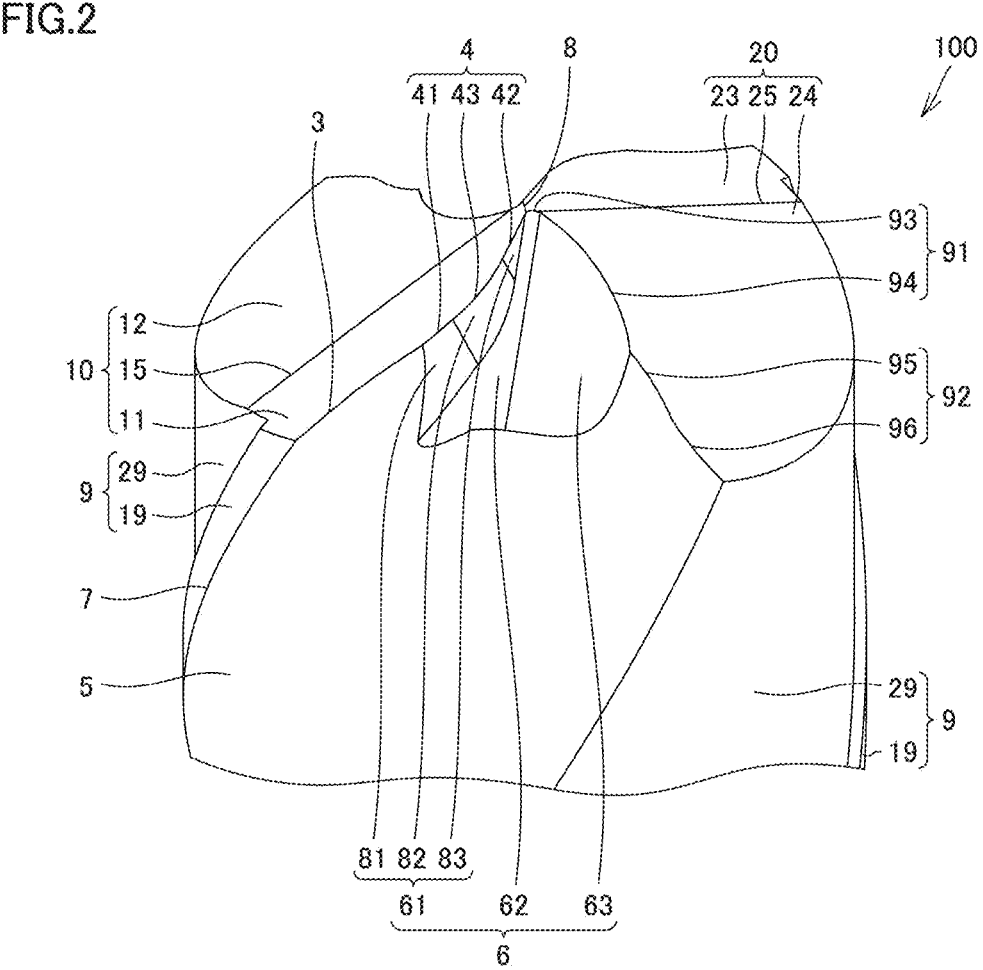
FIG. 2 is a schematic perspective view showing a front end portion of the drill according to the first embodiment.

FIG. 2 is a schematic perspective view showing a front end portion of drill 100 according to the first embodiment. As shown in FIG. 2, drill 100 further has a second flank face 20. Second flank face 20 is contiguous to each of first flank face 10, thinning face 6, helical flute surface 5, and outer peripheral surface 9. A ridgeline between first flank face 10 and second flank face 20 constitutes a chisel 8.

A ridgeline between helical flute surface 5 and first flank face 10 constitutes main cutting edge 3. Helical flute surface 5 close to main cutting edge 3 functions as a rake face. Thinning face 6 is contiguous to first flank face 10. A ridgeline between thinning face 6 and first flank face 10 constitutes a thinning cutting edge 4. Thinning cutting edge 4 is contiguous to main cutting edge 3. Thinning cutting edge 4 is located inward with respect to main cutting edge 3 in the radial direction. Thinning cutting edge 4 and main cutting edge 3 constitute a cutting edge of drill 100.

First flank face 10 has a first flank face portion 11 and a second flank face portion 12. First flank face portion 11 is contiguous to each of helical flute surface 5 and thinning face 6. Second flank face portion 12 is contiguous to first flank face portion 11. Second flank face portion 12 is inclined with respect to first flank face portion 11. A ridgeline between first flank face portion 11 and second flank face portion 12 is a first boundary line 15.

Second flank face 20 has a third flank face portion 23 and a fourth flank face portion 24. Third flank face portion 23 is contiguous to first flank face 10. Fourth flank face portion 24 is contiguous to each of third flank face portion 23, helical flute surface 5, and thinning face 6. Fourth flank face portion 24 is inclined with respect to third flank face portion 23. A ridgeline between third flank face portion 23 and fourth flank face portion 24 is a second boundary line 25.

Outer peripheral surface 9 has a first outer peripheral surface portion 19 and a second outer peripheral surface portion 29. First outer peripheral surface portion 19 is contiguous to each of first flank face portion 11 and helical flute surface 5. A ridgeline between first outer peripheral surface portion 19 and helical flute surface 5 constitutes a leading edge 7. Second outer peripheral surface portion 29 is contiguous to each of first flank face portion 11 and second flank face portion 12. First outer peripheral surface portion 19 is located outward with respect to second outer peripheral surface portion 29 in the radial direction. First outer peripheral surface portion 19 constitutes an outer peripheral margin.

Thinning face 6 has a thinning rake face portion 61, an intermediate surface 62, and a thinning pocket wall portion 63. Thinning rake face portion 61 is contiguous to each of helical flute surface 5 and first flank face 10. Specifically, thinning rake face portion 61 is contiguous to first flank face portion 11 of first flank face 10. Intermediate surface 62 is contiguous to each of thinning rake face portion 61, second flank face 20, and helical flute surface 5. Thinning rake face portion 61 is located between intermediate surface 62 and first flank face 10. Thinning pocket wall portion 63 is contiguous to each of intermediate surface 62, helical flute surface 5, and second flank face 20. Specifically, thinning pocket wall portion 63 is contiguous to fourth flank face portion 24 of second flank face 20. Intermediate surface 62 is located between thinning pocket wall portion 63 and thinning rake face portion 61.

Thinning rake face portion 61 has a first portion 81, a second portion 82, and a third portion 83. First portion 81 is contiguous to each of helical flute surface 5, first flank face 10, and intermediate surface 62. Second portion 82 is contiguous to each of first portion 81, first flank face 10, and intermediate surface 62. Third portion 83 is contiguous to each of second portion 82, first flank face 10, and intermediate surface 62. Third portion 83 is located inward with respect to first portion 81 in the radial direction. Second portion 82 is located between first portion 81 and third portion 83.

Thinning cutting edge 4 has a first straight thinning cutting edge portion 41, a curved thinning cutting edge portion 43, and a second straight thinning cutting edge portion 42. First straight thinning cutting edge portion 41 is contiguous to main cutting edge 3. First straight thinning cutting edge portion 41 is located inward with respect to main cutting edge 3 in the radial direction. First straight thinning cutting edge portion 41 is constituted of a ridgeline between first flank face portion 11 of first flank face 10 and first portion 81 of thinning rake face portion 61.

Curved thinning cutting edge portion 43 is contiguous to first straight thinning cutting edge portion 41. Curved thinning cutting edge portion 43 is located inward with respect to first straight thinning cutting edge portion 41 in the radial direction. Curved thinning cutting edge portion 43 is located opposite to main cutting edge 3 with respect to first straight thinning cutting edge portion 41. From another viewpoint, it can be said that first straight thinning cutting edge portion 41 is located between main cutting edge 3 and curved thinning cutting edge portion 43. Curved thinning cutting edge portion 43 is constituted of a ridgeline between first flank face portion 11 of first flank face 10 and second portion 82 of thinning rake face portion 61.

Second straight thinning cutting edge portion 42 is contiguous to curved thinning cutting edge portion 43. Second straight thinning cutting edge portion 42 is located inward with respect to curved thinning cutting edge portion 43 in the radial direction. Second straight thinning cutting edge portion 42 is opposite to first straight thinning cutting edge portion 41 with respect to curved thinning cutting edge portion 43. From another viewpoint, it can be said that curved thinning cutting edge portion 43 is located between first straight thinning cutting edge portion 41 and second straight thinning cutting edge portion 42. Second straight thinning cutting edge portion 42 is constituted of a ridgeline between first flank face portion 11 of first flank face 10 and third portion 83 of thinning rake face portion 61.

Thinning face 6 constitutes a first heel 91. Specifically, a ridgeline between thinning face 6 and second flank face 20 constitutes first heel 91. First heel 91 is contiguous to thinning cutting edge 4. First heel 91 has a heel inner peripheral portion 93 and a heel intermediate portion 94.

Helical flute surface 5 constitutes a second heel 92. Specifically, a ridgeline between helical flute surface 5 and fourth flank face portion 24 of second flank face 20 constitutes second heel 92. Second heel 92 is contiguous to first heel 91. Second heel 92 is located outward with respect to first heel 91 in the radial direction. Second heel 92 has a curved portion 95 and a heel outer peripheral portion 96.

Heel inner peripheral portion 93 is contiguous to second straight thinning cutting edge portion 42 of thinning cutting edge 4. Heel inner peripheral portion 93 is constituted of a ridgeline between second flank face 20 and intermediate surface 62.

Heel intermediate portion 94 is contiguous to heel inner peripheral portion 93. Heel intermediate portion 94 is located outward with respect to heel inner peripheral portion 93 in the radial direction. Heel intermediate portion 94 is constituted of a ridgeline between fourth flank face portion 24 of second flank face 20 and thinning pocket wall portion 63.

Curved portion 95 is contiguous to heel intermediate portion 94. Curved portion 95 is located outward with respect to heel intermediate portion 94 in the radial direction. Curved portion 95 is opposite to heel inner peripheral portion 93 with respect to heel intermediate portion 94. From another viewpoint, it can be said that heel intermediate portion 94 is located between heel inner peripheral portion 93 and curved portion 95.

Heel outer peripheral portion 96 is contiguous to curved portion 95. Heel outer peripheral portion 96 is located outward with respect to curved portion 95 in the radial direction. Heel outer peripheral portion 96 is opposite to heel intermediate portion 94 with respect to curved portion 95. From another viewpoint, it can be said that curved portion 95 is located between heel intermediate portion 94 and heel outer peripheral portion 96.

Figure 3:
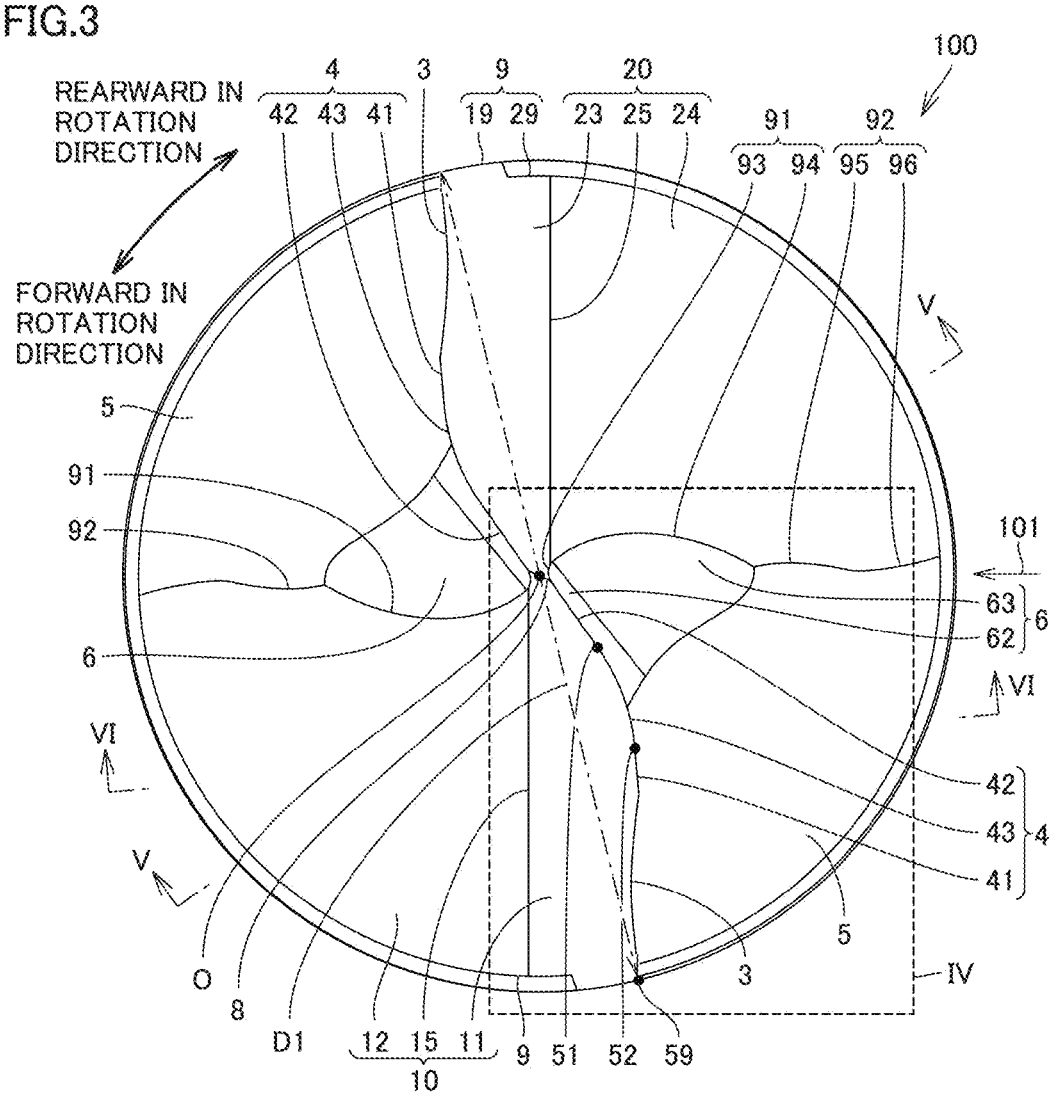
FIG. 3 is a schematic front view showing the configuration of the drill according to the first embodiment.

FIG. 3 is a schematic front view showing the configuration of drill 100 according to the first embodiment. As shown in FIG. 3, as viewed in the axis line direction, main cutting edge 3 may be recessed rearward in the rotation direction. The diameter of drill 100 is defined as a first diameter D1. First diameter D1 is the diameter of main cutting edge 3. In other words, as viewed in the axis line direction, first diameter D1 is twice as large as a distance between outermost peripheral end 59 of main cutting edge 3 and axis line O.

As shown in FIG. 3, curved thinning cutting edge portion 43 protrudes forward in the rotation direction. Curved thinning cutting edge portion 43 has a first end portion 51 and a second end portion 52. First end portion 51 is a boundary between curved thinning cutting edge portion 43 and second straight thinning cutting edge portion 42. In other words, at first end portion 51, curved thinning cutting edge portion 43 is contiguous to second straight thinning cutting edge portion 42.

Second end portion 52 is opposite to first end portion 51. From another viewpoint, it can be said that a distance between second end portion 52 and axis line O is longer than a distance between first end portion 51 and axis line O as viewed in the axis line direction. Second end portion 52 is a boundary between curved thinning cutting edge portion 43 and first straight thinning cutting edge portion 41. In other words, at second end portion 52, curved thinning cutting edge portion 43 is contiguous to first straight thinning cutting edge portion 41.

As shown in FIG. 3, as viewed in the axis line direction, second straight thinning cutting edge portion 42 is close to axis line O with respect to curved thinning cutting edge portion 43. As viewed in the axis line direction, second straight thinning cutting edge portion 42 has a straight shape. As viewed in the axis line direction, first straight thinning cutting edge portion 41 is located far away from axis line O with respect to curved thinning cutting edge portion 43. As viewed in the axis line direction, first straight thinning cutting edge portion 41 has a straight shape.

Second flank face portion 12 of first flank face 10 is located rearward with respect to first flank face portion 11 in the rotation direction. As viewed in the axis line direction, first boundary line 15 has a straight shape. A plan view direction 101 is defined as a direction that is perpendicular to first boundary line 15 and extends inward in the radial direction as viewed in the axis line direction.

Fourth flank face portion 24 of second flank face 20 is located rearward with respect to third flank face portion 23 in the rotation direction. As viewed in the axis line direction, second boundary line 25 has a straight shape. As viewed in the axis line direction, second boundary line 25 may be substantially parallel to first boundary line 15.

First flank face portion 11 of first flank face 10 is contiguous to third flank face portion 23 of second flank face 20. Chisel 8 intersects axis line O. In other words, a boundary between first flank face portion 11 and third flank face portion 23 intersects axis line O.

As shown in FIG. 3, heel inner peripheral portion 93 has a curved shape as viewed in axis line direction. Heel intermediate portion 94 is recessed forward in the rotation direction. Curved portion 95 is recessed forward in the rotation direction. At a boundary between heel intermediate portion 94 and curved portion 95, first heel 91 and second heel 92 protrude rearward in the rotation direction. From another viewpoint, it can be said that a boundary between heel intermediate portion 94 and curved portion 95 is an inflection point as viewed in the axis line direction. Heel outer peripheral portion 96 may protrude rearward in the rotation direction.

Thinning pocket wall portion 63 is located forward with respect to thinning cutting edge 4 in the rotation direction. First heel 91 is located forward with respect to thinning cutting edge 4 in the rotation direction. Second heel 92 is located forward with respect to main cutting edge 3 in the rotation direction.

As viewed in the axis line direction, the shape of drill 100 is substantially rotationally symmetric with respect to axis line O. When the number of cutting edges of drill 100 is N, the shape of drill 100 is substantially N-fold symmetric with respect to axis line O. When the number of cutting edges of drill 100 is 2, the shape of drill 100 is two-fold symmetric with respect to axis line O as viewed in the axis line direction. When first flank face 10 is rotated by 180° with respect to axis line O, the shape of first flank face 10 substantially coincides with the shape of second flank face 20. First flank face portion 11 of first flank face 10 corresponds to third flank face portion 23 of second flank face 20. Second flank face portion 12 of first flank face 10 corresponds to fourth flank face portion 24 of second flank face 20.

Figure 4:
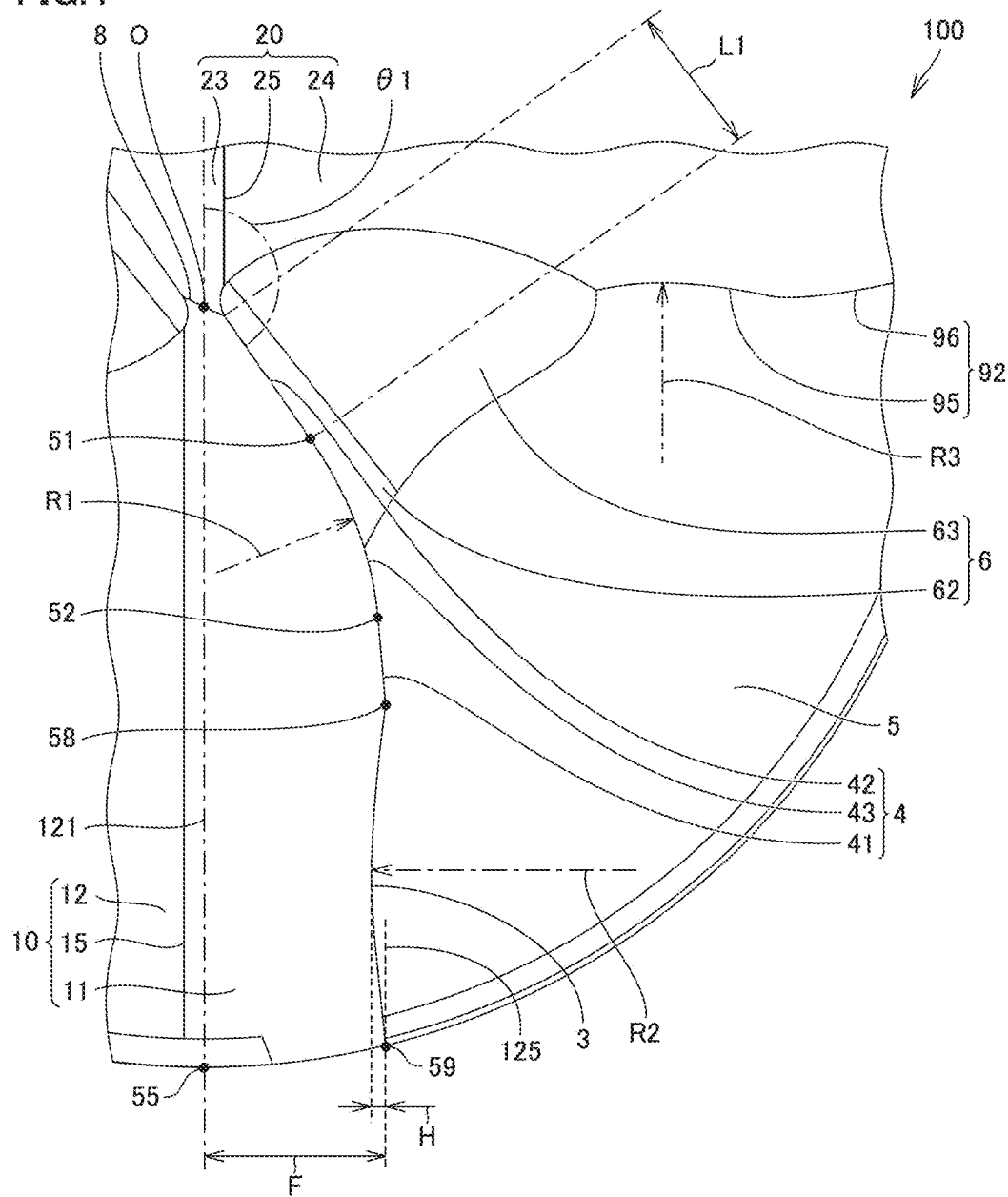
FIG. 4 is an enlarged schematic diagram of a region IV in FIG. 3.

FIG. 4 is an enlarged schematic diagram of a region IV in FIG. 3. As shown in FIG. 4, a first boundary point 58 is defined as a boundary between main cutting edge 3 and thinning cutting edge 4. In other words, at first boundary point 58, main cutting edge 3 is contiguous to thinning cutting edge 4. A first straight line 121 is defined as a straight line passing through axis line O and outer peripheral position 55 separated rearward in the rotation direction from outermost peripheral end 59 of main cutting edge 3 by a predetermined outer peripheral core height F. As viewed in the axis line direction, outer peripheral position 55 is located on an outer periphery of drill 100. From another viewpoint, it can be said that a distance between outer peripheral position 55 and axis line O is 50% of first diameter D1 as viewed in the axis line direction.

First straight line 121 may be substantially parallel to first boundary line 15. First straight line 121 may be substantially parallel to second boundary line 25. Outer peripheral core height F is a distance between outermost peripheral end 59 and outer peripheral position 55 in the rotation direction as viewed in the axis line direction. Outer peripheral core height F is, for example, 8% of first diameter D1. Outer peripheral core height F may be 10% of first diameter D1 or 12% of first diameter D1, for example.

A first angle $\theta 1$ is defined as an angle formed by first straight line 121 and second straight thinning cutting edge portion 42 as viewed in the axis line direction. First angle $\theta 1$ is 135° or more and 160° or less. The lower limit of first angle $\theta 1$ is not particularly limited, but may be, for example, 140° or more or 143° or more. The upper limit of first angle $\theta 1$ is not particularly limited, but may be, for example, 155° or less or 152° or less.

As shown in FIG. 4, a first length L1 is defined as a length of second straight thinning cutting edge portion 42 as viewed in the axis line direction. First length L1 is 10% or less of first diameter D1. The upper limit of first length L1 is not particularly limited, but may be, for example, 8% or less of first diameter D1 or 5% or less of first diameter D1. The lower limit of first length L1 is not particularly limited, but may be, for example, 1% or more of first diameter D1 or 3% or more of first diameter D1.

As shown in FIG. 4, curved thinning cutting edge portion 43 may have an arc shape as viewed in the axis line direction. A first curvature radius R1 is defined as the curvature radius of curved thinning cutting edge portion 43 as viewed in the axis line direction. First curvature radius R1 is 15% or more and 35% or less of first diameter D1. The lower limit of first curvature radius R1 is not particularly limited, but may be, for example, 20% or more of first diameter D1 or 23% or more of first diameter D1. The upper limit of first curvature radius R1 is not particularly limited, but may be, for example, 30% or less of first diameter D1 or 27% or less of first diameter D1.

As shown in FIG. 4, main cutting edge 3 may have an arc shape as viewed in the axis line direction. A second curvature radius R2 is defined as a curvature radius of main cutting edge 3 as viewed in the axis line direction. Second curvature radius R2 may be larger than first curvature radius R1. Second curvature radius R2 is, for example, 40% or more and 100% or less of first diameter D1. The lower limit of second curvature radius R2 is not particularly limited, but may be, for example, 50% or more of first diameter D1 or 60% or more of first diameter D1. The upper limit of second curvature radius R2 is not particularly limited, but may be, for example, 90% or less of first diameter D1 or 80% or less of first diameter D1.

As shown in FIG. 4, curved portion 95 may have an arc shape as viewed in the axis line direction. A third curvature radius R3 is defined as a curvature radius of curved portion 95 as viewed in the axis line direction. Third curvature radius R3 may be smaller than second curvature radius R2. Third curvature radius R3 is, for example, 15% or more and 25% or less of first diameter D1. The lower limit of third curvature radius R3 is not particularly limited, but may be, for example, 17% or more of first diameter D1 or 19% or more of first diameter D1. The upper limit of third curvature radius R3 is not particularly limited, but may be, for example, 23% or less of first diameter D1 or 21% or less of first diameter D1.

A fifth straight line 125 is defined as a straight line that is parallel to first straight line 121 and passes through outermost peripheral end 59 of main cutting edge 3 as viewed in the axis line direction. A maximum distance H is defined as a maximum distance between fifth straight line 125 and main cutting edge 3. Maximum distance H is, for example, 0.5% or more and 4% or less of first diameter D1. The lower limit of maximum distance H is not particularly limited, but may be, for example, 1% or more of first diameter D1 or 1.5% or more of first diameter D1. The upper limit of maximum distance H is not particularly limited, but may be, for example, 3.5% or less of first diameter D1 or 3% or less of first diameter D1.

Figure 5:
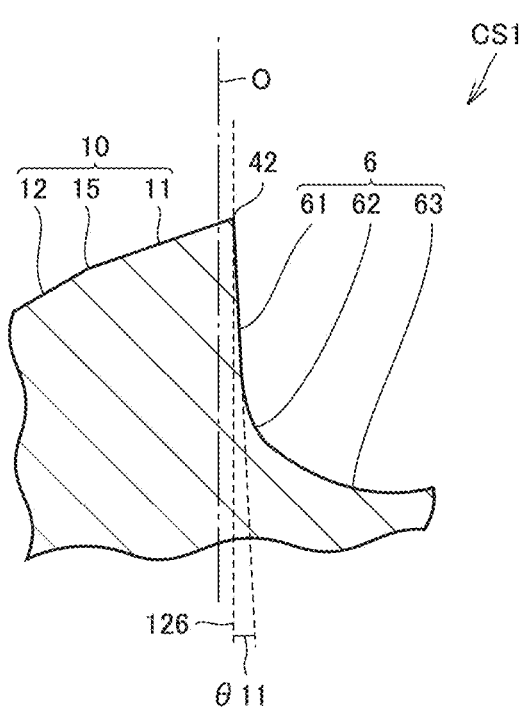
FIG. 5 is a schematic cross sectional view along a line V-V of FIG. 3.

FIG. 5 is a schematic cross sectional view along a line V-V of FIG. 3. The cross section shown in FIG. 5 is a cross section that is perpendicular to second straight thinning cutting edge portion 42 as viewed in the axis line direction and intersects second straight thinning cutting edge portion 42. In the description below, the cross section that is perpendicular to second straight thinning cutting edge portion 42 as viewed in the axis line direction and intersects second straight thinning cutting edge portion 42 is also referred to as "first cross section CS1". As shown in FIG. 5, in first cross section CS1, thinning rake face portion 61 of thinning face 6 may have a straight shape. In first cross section CS1, an angle formed by first flank face portion 11 of first flank face 10 and thinning rake face portion 61 of thinning face 6 is, for example, an acute angle.

In first cross section CS1, a sixth straight line 126 is defined as a straight line that is parallel to axis line O and that includes second straight thinning cutting edge portion 42. A first axial rake angle $\theta 11$ is defined as an angle formed by sixth straight line 126 and thinning rake face portion 61 of thinning face 6. First axial rake angle $\theta 11$ is an axial rake angle of second straight thinning cutting edge portion 42 in first cross section CS1.

In first cross section CS1, first axial rake angle θ11 is −10° or more and 0° or less. The lower limit of first axial rake angle θ11 is not particularly limited, but may be, for example, −8° or more or −6° or more. The upper limit of first axial rake angle θ11 is not particularly limited, but may be, for example, −2° or less or −4° or less.

In the present specification, a "negative" axial rake angle of the cutting edge represents a state in which the rake face of the cutting edge is inclined forward in the rotation direction with respect to a straight line parallel to axis line O as viewed in the radial direction. On the other hand, in the present specification, a "positive" axial rake angle of the cutting edge represents a state in which the rake face of the cutting edge is inclined rearward in the rotation direction with respect to the straight line parallel to axis line O as viewed in the radial direction.

Figure 6:
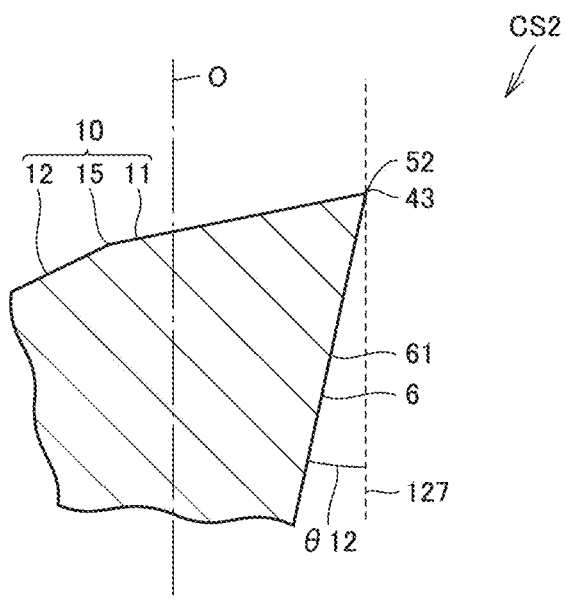
FIG. 6 is a schematic cross sectional view along a line VI-VI of FIG. 3.

FIG. 6 is a schematic cross sectional view along a line VI-VI of FIG. 3. The cross section shown in FIG. 6 is a cross section that is perpendicular to a tangent of curved thinning cutting edge portion 43 at second end portion 52 as viewed in the axis line direction and includes second end portion 52. In the description below, the cross section that is perpendicular to the tangent of curved thinning cutting edge portion 43 at second end portion 52 as viewed in the axis line direction and includes second end portion 52 is also referred to as "second cross section CS2". As shown in FIG. 6, in second cross section CS2, thinning rake face portion 61 of thinning face 6 may have a straight shape. In second cross section CS2, an angle formed by first flank face portion 11 of first flank face 10 and thinning rake face portion 61 of thinning face 6 is an acute angle.

In second cross section CS2, a seventh straight line 127 is defined as a straight line that is parallel to axis line O and includes curved thinning cutting edge portion 43. A second axial rake angle θ12 is defined as an angle formed by seventh straight line 127 and thinning rake face portion 61 of thinning face 6. Second axial rake angle θ12 is an axial rake angle of curved thinning cutting edge portion 43 in second cross section CS2. Second axial rake angle θ12 is larger than first axial rake angle θ11.

In second cross section CS2, second axial rake angle θ12 is 5° or more and 20° or less. The lower limit of second axial rake angle θ12 is not particularly limited, but may be, for example, 8° or more or 10° or more. The upper limit of second axial rake angle θ12 is not particularly limited, but may be, for example, 17° or less or 15° or less.

Figure 7:
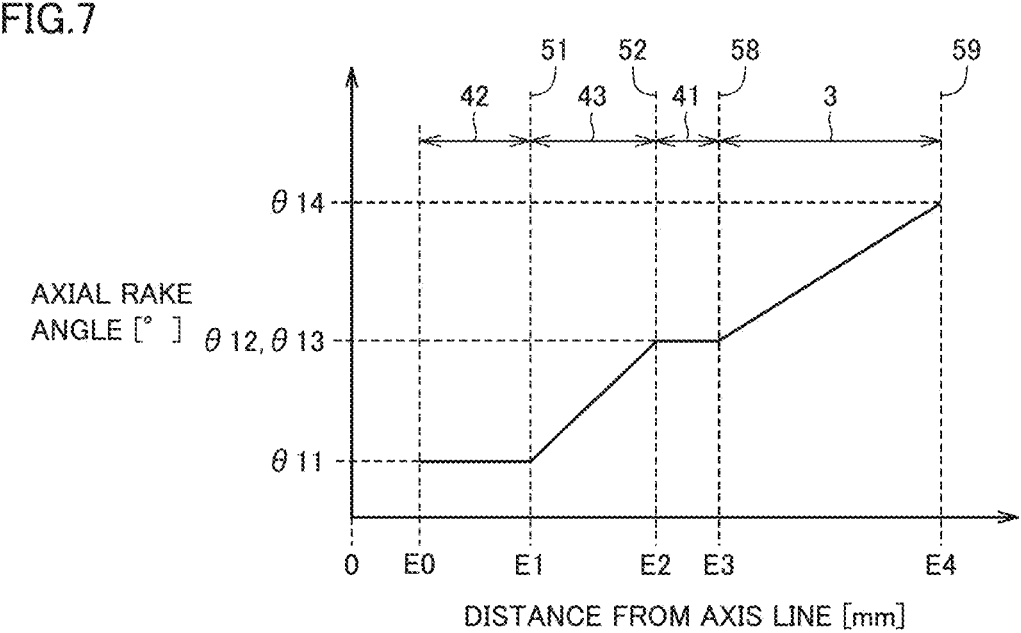
FIG. 7 is a schematic diagram showing a relation between a distance from an axis line in a cutting edge and an axial rake angle of the cutting edge.

FIG. 7 is a schematic diagram showing a relation between a distance from axis line O in the cutting edge and the axial rake angle of the cutting edge. In FIG. 7, the vertical axis represents the axial rake angle of the cutting edge, and the horizontal axis represents the distance from axis line O in the cutting edge. A reference distance E0 is defined as a distance from axis line O at an end portion of second straight thinning cutting edge portion 42 opposite to first end portion 51. A first distance E1 is defined as a distance from axis line O at first end portion 51. A second distance E2 is defined as a distance from axis line O at second end portion 52. A third distance E3 is defined as a distance from axis line O at first boundary point 58. A fourth distance E4 is defined as a distance from axis line O at outermost peripheral end 59.

A third axial rake angle θ13 is defined as an axial rake angle of first straight thinning cutting edge portion 41 at first boundary point 58. Third axial rake angle θ13 is substantially the same angle as second axial rake angle θ12 because first straight thinning cutting edge portion 41 extends along the tangent of curved thinning cutting edge portion 43 at second end portion 52. A fourth axial rake angle θ14 is defined as an axial rake angle of main cutting edge 3 at outermost peripheral end 59. Fourth axial rake angle θ14 is larger than third axial rake angle θ13. Fourth axial rake angle θ14 is, for example, 30°.

As shown in FIG. 7, the axial rake angle may be substantially unchanged at second straight thinning cutting edge portion 42. The axial rake angle is monotonously increased at curved thinning cutting edge portion 43. The axial rake angle of curved thinning cutting edge portion 43 in the cross section perpendicular to the tangent of curved thinning cutting edge portion 43 as viewed in the axis line direction is larger in a direction further away from first end portion 51. In a region from first end portion 51 to second end portion 52, the axial rake angle of curved thinning cutting edge portion 43 is changed from first axial rake angle θ11 to second axial rake angle θ12. It should be noted that curved thinning cutting edge portion 43 may have a portion at which the axial rake angle is unchanged. The axial rake angle may be substantially unchanged at first straight thinning cutting edge portion 41.

In main cutting edge 3, the axial rake angle is monotonously increased. The axial rake angle of main cutting edge 3 becomes larger in a direction toward outermost peripheral end 59 in the cross section perpendicular to the tangent of main cutting edge 3 as viewed in the axis line direction. In a region from first boundary point 58 to outermost peripheral end 59, the axial rake angle of main cutting edge 3 is changed from a third axial rake angle θ13 to a fourth axial rake angle θ14. It should be noted that main cutting edge 3 may have a portion at which the axial rake angle is unchanged.

A first change ratio is defined as an amount of change in the axial rake angle per length at curved thinning cutting edge portion 43. Specifically, the first change ratio is a value obtained by dividing the absolute value of a difference between second axial rake angle θ12 and first axial rake angle θ11 by the absolute value of a difference between second distance E2 and first distance E1. A second change ratio is defined as an amount of change in the axial rake angle per length at main cutting edge 3. Specifically, the second change ratio is a value obtained by dividing the absolute value of a difference between fourth axial rake angle θ14 and third axial rake angle θ13 by the absolute value of a difference between fourth distance E4 and third distance E3. The first change ratio may be larger than the second change ratio.

Figure 8:
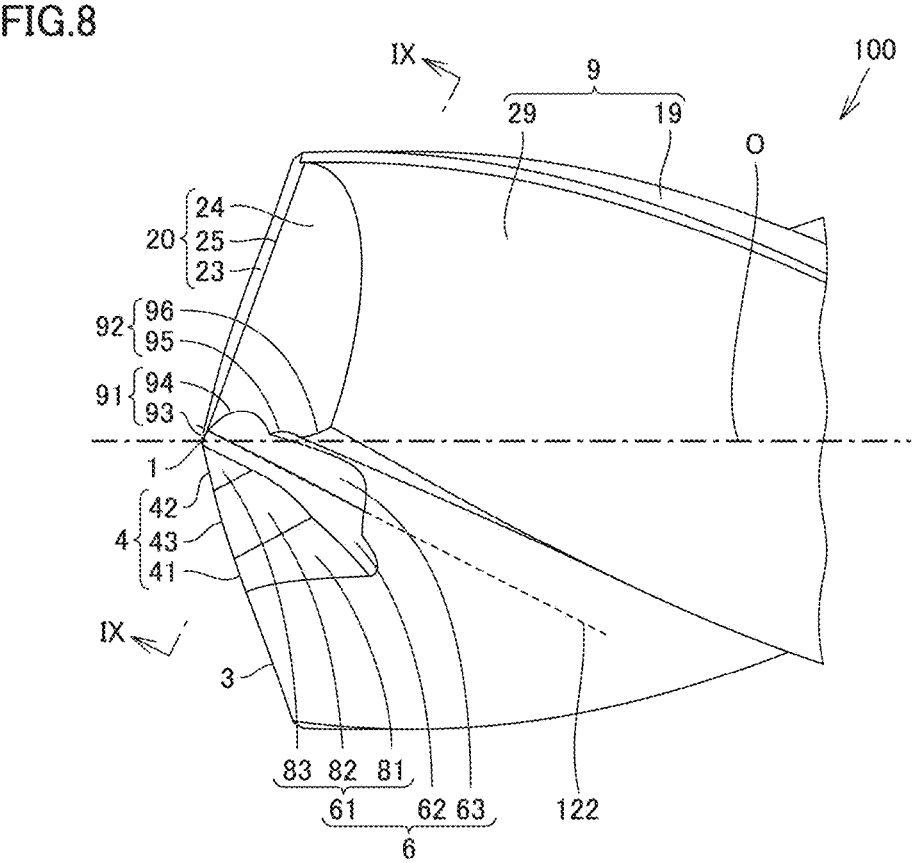
FIG. 8 is an enlarged schematic plan view of a region VIII in FIG. 1.

FIG. 8 is an enlarged schematic plan view of a region VIII in FIG. 1. The enlarged schematic plan view shown in FIG. 8 shows the configuration of the front end portion of drill 100 as viewed in plan view direction 101. As shown in FIG. 8, a boundary line between thinning pocket wall portion 63 and intermediate surface 62 may have a straight shape. A second straight line 122 is defined as a straight line along the boundary line between thinning pocket wall portion 63 and intermediate surface 62. It should be noted that when the boundary line between thinning pocket wall portion 63 and intermediate surface 62 has a curved shape, second straight line 122 is defined as a straight line including both ends of the boundary line between thinning pocket wall portion 63 and intermediate surface 62. As viewed in plan view direction 101, the boundary line between thinning pocket wall portion 63 and intermediate surface 62 intersects axis line O. As viewed in plan view direction 101, second straight line 122 intersects axis line O. As viewed in plan view direction 101, heel inner peripheral portion 93 of first heel 91 intersects axis line O.

Figure 9:
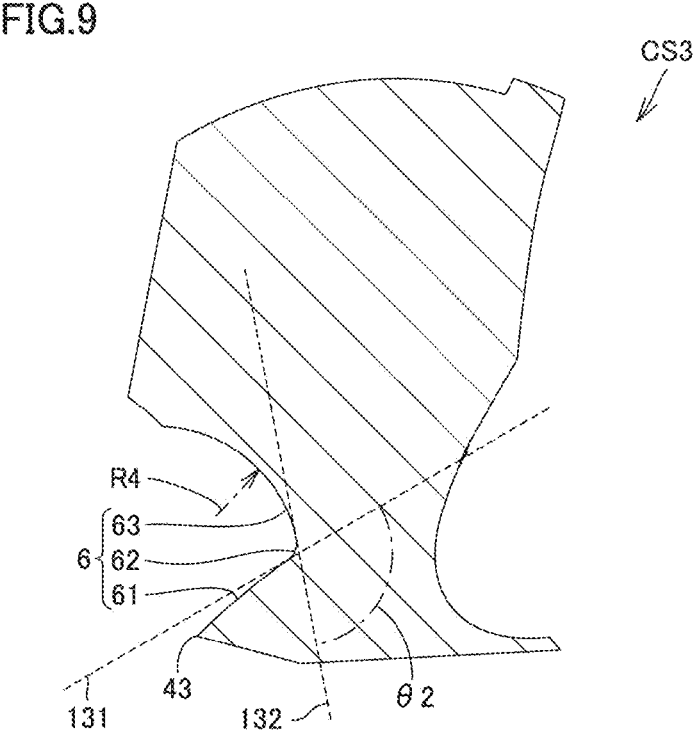
FIG. 9 is a schematic cross sectional view along a line IX-IX of FIG. 8.

FIG. 9 is a schematic cross sectional view along a line IX-IX of FIG. 8. The cross section shown in FIG. 9 is a cross section that is perpendicular to second straight line 122 as viewed in plan view direction 101 and intersects the boundary line between thinning pocket wall portion 63 and intermediate surface 62. The cross section shown in FIG. 9 intersects each of curved thinning cutting edge portion 43 and the boundary between second portion 82 of thinning rake face portion 61 and intermediate surface 62. In the description below, the cross section that is perpendicular to second straight line 122 as viewed in plan view direction 101 and intersects the boundary line between thinning pocket wall portion 63 and intermediate surface 62 is also referred to as "third cross section CS3".

In third cross section CS3, thinning pocket wall portion 63 has a curved shape. In third cross section CS3, thinning pocket wall portion 63 may have an arc shape. In third cross section CS3, a fourth curvature radius R4 is defined as a curvature radius of thinning pocket wall portion 63. Fourth curvature radius R4 is 10% or more and 30% or less of first diameter D1. The lower limit of fourth curvature radius R4 is not particularly limited, but may be, for example, 15% or more of first diameter D1 or 18% or more of first diameter D1. The upper limit of fourth curvature radius R4 is not particularly limited, but may be, for example, 25% or less of first diameter D1 or 22% or less of first diameter D1.

In third cross section CS3, intermediate surface 62 may have an arc shape. The curvature radius of intermediate surface 62 is smaller than fourth curvature radius R4. In third cross section CS3, a first tangent 131 is defined as a tangent of thinning rake face portion 61 at the boundary between thinning rake face portion 61 and intermediate surface 62. In third cross section CS3, a second tangent 132 is defined as a tangent of thinning pocket wall portion 63 at the boundary between thinning pocket wall portion 63 and intermediate surface 62. A second angle $\theta 2$ is defined as an angle formed by first tangent 131 and second tangent 132.

Second angle $\theta 2$ is 105° or more and 125° or less. The lower limit of second angle $\theta 2$ is not particularly limited, but may be 110° or more or 113° or more, for example. The upper limit of second angle $\theta 2$ is not particularly limited, but may be, for example, 120° or less or 117° or less.

Figure 10:
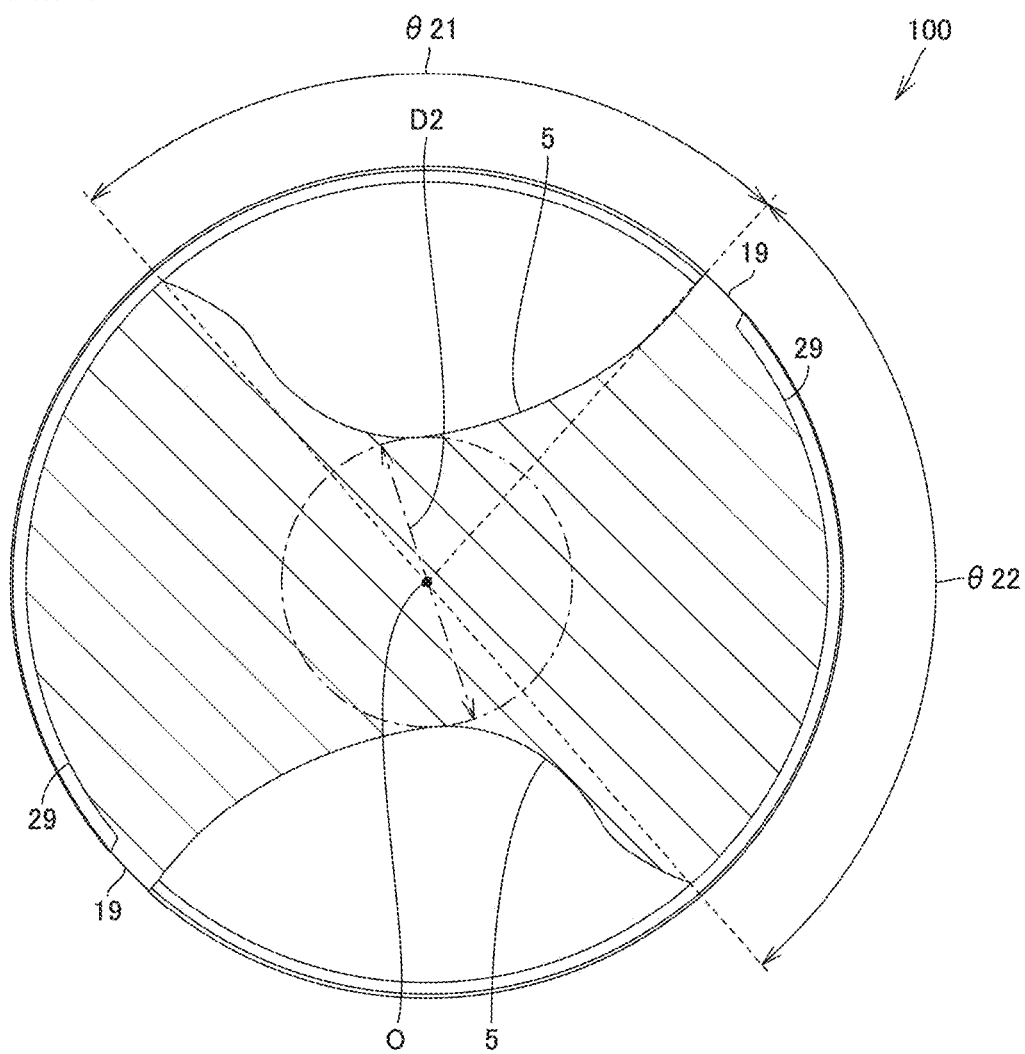
FIG. 10 is a schematic cross sectional view along a line X-X of FIG. 1.

FIG. 10 is a schematic cross sectional view along a line X-X of FIG. 1. The cross section shown in FIG. 10 is perpendicular to axis line O. In the axis line direction, a distance between the cross section shown in FIG. 10 and front end 1 of drill 100 is the same as first diameter D1.

As shown in FIG. 10, a second diameter D2 is defined as a core thickness of drill 100. Second diameter D2 is, for example, 20% or more and 40% or less of first diameter D1. It should be noted that the core thickness of drill 100 is twice as large as the minimum distance between axis line O and helical flute surface 5 in a cross section perpendicular to axis line O.

As shown in FIG. 10, in the cross section perpendicular to axis line O, a first central angle $\theta 21$ is defined as a central angle of helical flute surface 5, and a second central angle $\theta 22$ is defined as a central angle of a portion other than helical flute surface 5. First central angle $\theta 21$ is an angle formed by a line segment that connects between axis line O and the end portion of helical flute surface 5 located forward in the rotation direction and a line segment that connects between axis line O and the end portion of helical flute surface 5 located rearward in the rotation direction. The end portion of helical flute surface 5 located forward in the rotation direction is a boundary between second outer peripheral surface portion 29 and helical flute surface 5. The end portion of helical flute surface 5 located rearward in the rotation direction is a boundary between first outer peripheral surface portion 19 and helical flute surface 5. When the number of cutting edges of drill 100 is N, second central angle $\theta 22$ is a value obtained by subtracting first central angle $\theta 21$ from a value obtained by dividing 360° by N. When the number of cutting edges of drill 100 is 2, second central angle $\theta 22$ is a value obtained by subtracting first central angle $\theta 21$ from 180°.

In the cross section perpendicular to axis line O, first central angle $\theta 21$ is, for example, 0.55 time or more and 1.0 time or less as large as second central angle $\theta 22$. In the cross section perpendicular to axis line O, the lower limit of first central angle $\theta 21$ is not particularly limited, but may be, for example, 0.6 time or more as large as second central angle $\theta 22$, or 0.65 time or more as large as second central angle $\theta 22$. In the cross section perpendicular to axis line O, the upper limit of first central angle $\theta 21$ is not particularly limited, but may be, for example, 0.9 time or less as large as second central angle $\theta 22$, or 0.85 time or less as large as second central angle $\theta 22$.

Second Embodiment

Next, a configuration of a drill 100 according to a second embodiment will be described. Drill 100 according to the second embodiment is different from drill 100 according to the first embodiment in that drill 100 according to the second embodiment has a reinforcing cutting edge portion, and the other points are substantially the same as those of drill 100 according to the first embodiment. Hereinafter, the difference from drill 100 according to the first embodiment will be mainly described.

Figure 11:
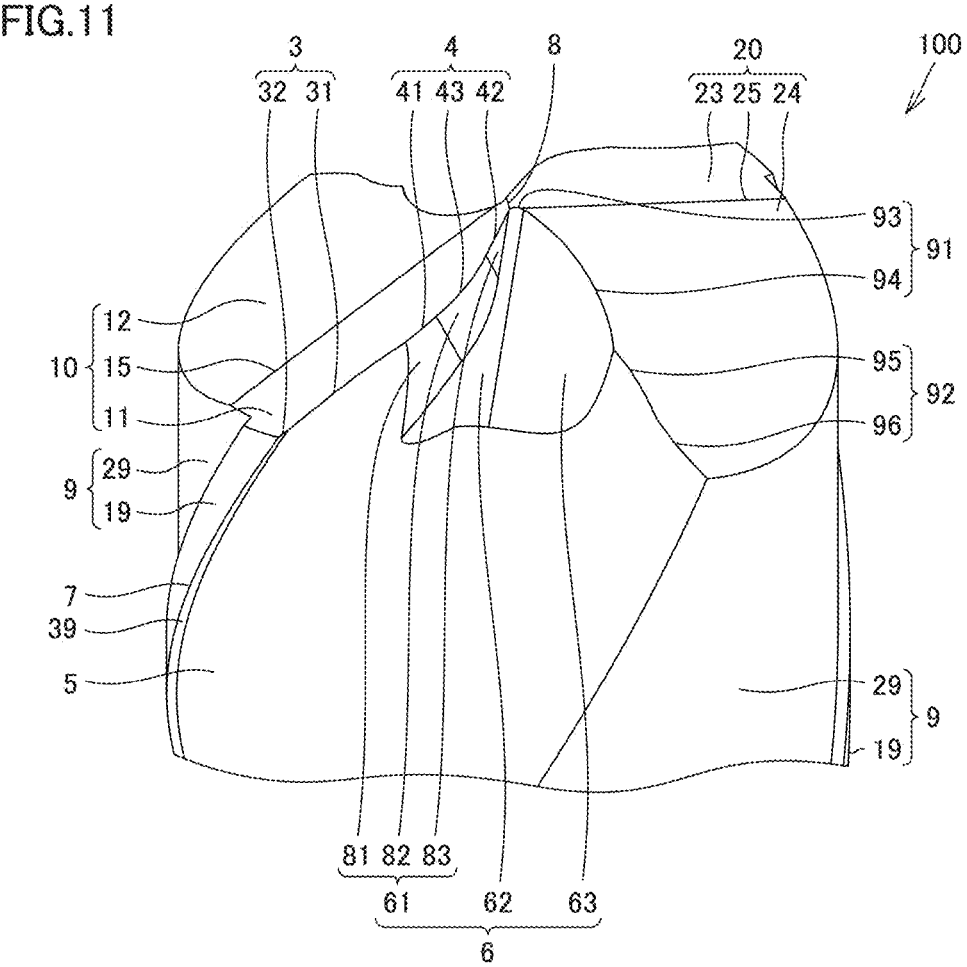
FIG. 11 is a schematic perspective view showing a front end portion of a drill according to a second embodiment.

FIG. 11 is a schematic perspective view showing a front end portion of drill 100 according to the second embodiment. The schematic perspective view shown in FIG. 11 corresponds to the schematic perspective view shown in FIG. 2. As shown in FIG. 11, drill 100 may further have a reinforcing rake face 39. Reinforcing rake face 39 is contiguous to each of first flank face 10, helical flute surface 5, and first outer peripheral surface portion 19. A ridgeline between reinforcing rake face 39 and first outer peripheral surface portion 19 constitutes leading edge 7.

Main cutting edge 3 may have a curved cutting edge portion 31 and a reinforcing cutting edge portion 32. Curved cutting edge portion 31 is contiguous to first straight thinning cutting edge portion 41. Reinforcing cutting edge portion 32 is contiguous to curved cutting edge portion 31. Reinforcing cutting edge portion 32 is located outward with respect to curved cutting edge portion 31 in the radial direction. Reinforcing cutting edge portion 32 is constituted of a ridgeline between first flank face 10 and reinforcing rake face 39.

Figure 12:
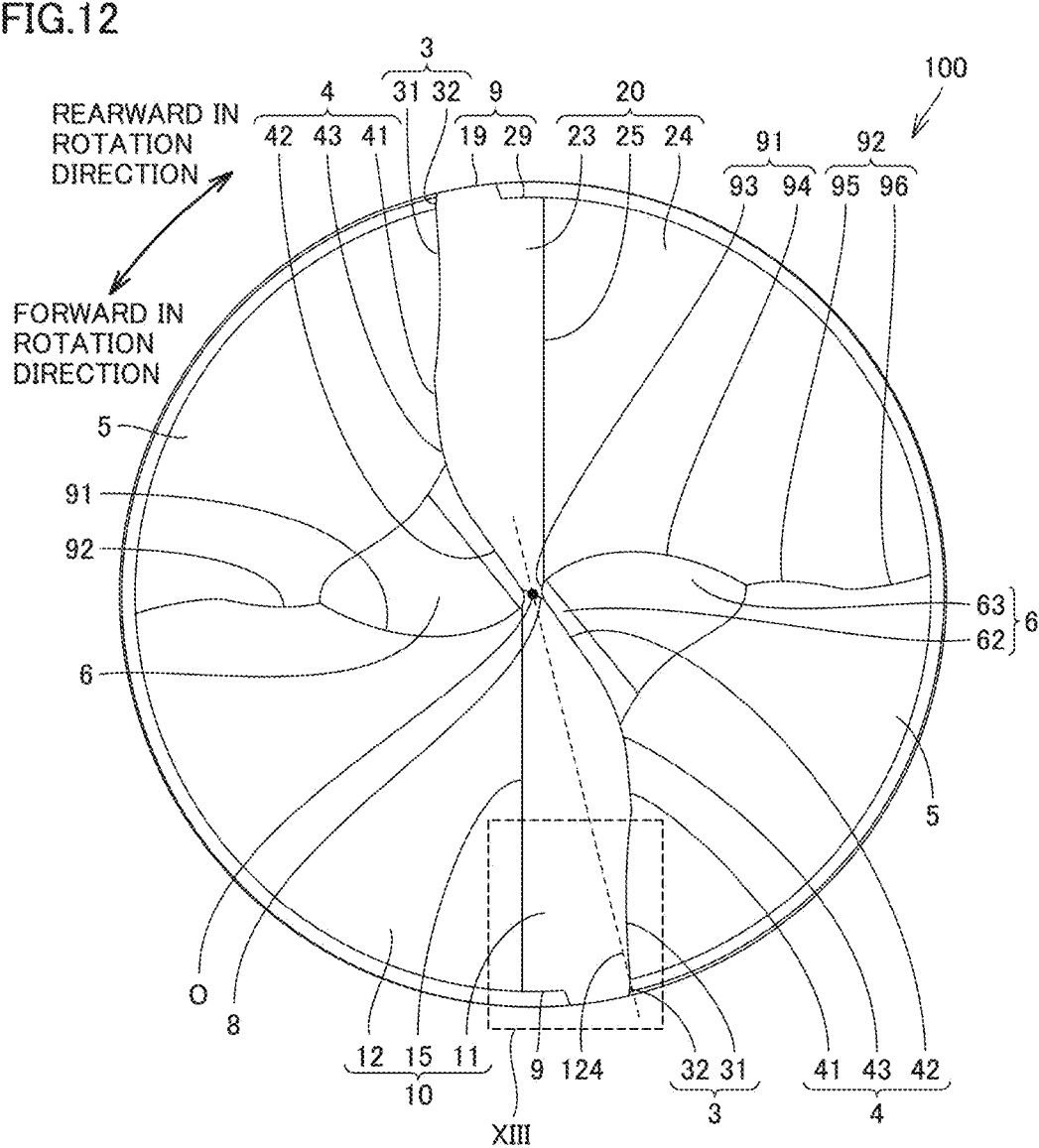
FIG. 12 is a schematic front view showing a configuration of the drill according to the second embodiment.
Figure 13:
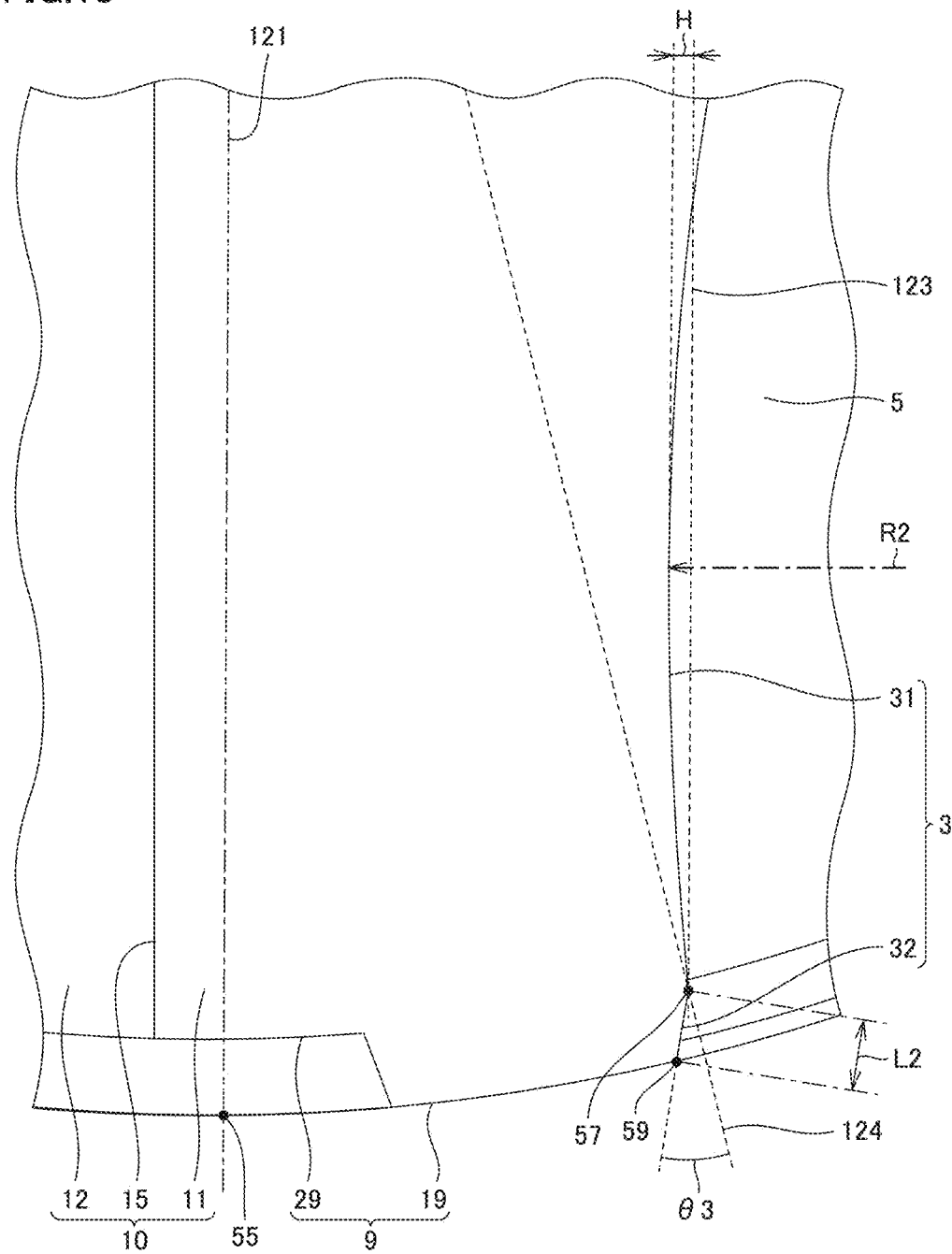
FIG. 13 is an enlarged schematic diagram of a region XIII in FIG. 12.

FIG. 12 is a schematic front view showing the configuration of drill 100 according to the second embodiment. The schematic front view shown in FIG. 12 corresponds to the schematic front view shown in FIG. 3. FIG. 13 is an enlarged schematic diagram of a region XIII in FIG. 12. As shown in FIGS. 12 and 13, curved cutting edge portion 31 is recessed rearward in the rotation direction. As viewed in the axis line direction, reinforcing cutting edge portion 32 has a straight shape, for example. Reinforcing cutting edge portion 32 constitutes outermost peripheral end 59.

As shown in FIGS. 12 and 13, a second boundary point 57 is defined as a boundary between curved cutting edge portion 31 and reinforcing cutting edge portion 32. Second boundary point 57 is an outer peripheral end of curved cutting edge portion 31. A fourth straight line 124 is defined as a straight line including second boundary point 57 and axis line O as viewed in the axis line direction. As viewed in the axis line direction, reinforcing cutting edge portion 32 is inclined rearward with respect to fourth straight line 124 in the rotation direction. A third angle θ3 is defined as an angle formed by reinforcing cutting edge portion 32 and fourth straight line 124 as viewed in the axis line direction. Third angle θ3 is, for example, 15° or more and 30° or less. The lower limit of third angle θ3 is not particularly limited, but may be, for example, 18° or more, or 21° or more. The upper limit of third angle θ3 is not particularly limited, but may be, for example, 27° or less, or 24° or less.

As shown in FIG. 13, a second length L2 is defined as a length of reinforcing cutting edge portion 32 as viewed in the axis line direction. It should be noted that when reinforcing cutting edge portion 32 has a curved shape as viewed in the axis line direction, second length L2 is a length of a line segment that connects between both ends of reinforcing cutting edge portion 32. Second length L2 is, for example, 1% or more and 2% or less of first diameter D1. The lower limit of second length L2 is not particularly limited, but may be, for example, 1.2% or more of first diameter D1 or 1.4% or more of first diameter D1. The upper limit of second length L2 is not particularly limited, but may be, for example, 1.8% or less of first diameter D1 or 1.6% or less of first diameter D1.

As shown in FIG. 13, a third straight line 123 is defined as a straight line that passes through second boundary point 57 and that is parallel to first straight line 121. In other words, third straight line 123 is defined as a straight line that passes through the outer peripheral end of curved cutting edge portion 31 and that is parallel to first straight line 121. When main cutting edge 3 has curved cutting edge portion 31, maximum distance H is defined as a maximum distance between third straight line 123 and curved cutting edge portion 31 as viewed in the axis line direction. As viewed in the axis line direction, curved cutting edge portion 31 may have an arc shape. When main cutting edge 3 has curved cutting edge portion 31, a second curvature radius R2 is defined as a curvature radius of curved cutting edge portion 31.

It should be noted that in the description above, drill 100 has two main cutting edges 3, but the number of main cutting edges 3 is not limited to two. The number of main cutting edges 3 may be three or four or more. The workpiece is a metal such as a stainless steel material (SUS), for example. The workpiece may be a carbon steel, an alloy steel, or a difficult-to-cut material.

Next, functions and effects of drill 100 according to the present embodiment will be described.

When the cutting edge of drill 100 has a portion having a large change in the axial rake angle, a change in cutting resistance to be received by the cutting edge is large in the vicinity of the portion. Thus, pressure applied from drill 100 to the workpiece is concentrated in the vicinity of the portion. As a result, melting and adhesion of a chip may occur in the vicinity of the portion.

According to drill 100 of the present embodiment, the axial rake angle of curved thinning cutting edge portion 43 in the cross section perpendicular to the tangent of curved thinning cutting edge portion 43 as viewed in the axis line direction is larger in the direction further away from first end portion 51. The curvature radius (first curvature radius R1) of curved thinning cutting edge portion 43 is 15% or more of the diameter (first diameter D1) of drill 100 as viewed in the axis line direction. Therefore, the length of curved thinning cutting edge portion 43 can be made large as compared with the case where the curvature radius of curved thinning cutting edge portion 43 is too small. Thus, the amount of change in the axial rake angle per length at curved thinning cutting edge portion 43 can be made small. Therefore, the cutting resistance to be received by the cutting edge of drill 100 can be suppressed from being changed abruptly. As a result, a chip can be suppressed from being melted and adhered to the cutting edge.

Further, when the length of curved thinning cutting edge portion 43 is sufficiently long, a distance between second end portion 52 of curved thinning cutting edge portion 43 and outermost peripheral end 59 is short. Therefore, the axial rake angle of curved thinning cutting edge portion 43 at second end portion 52 is close to fourth axial rake angle θ14. In other words, the axial rake angle of curved thinning cutting edge portion 43 at second end portion 52 is large. Thus, the cutting resistance at curved thinning cutting edge portion 43 can be reduced.

When the angle (first angle θ1) formed by first straight line 121 and thinning cutting edge 4 is too large as viewed in the axis line direction, a distance between first end portion 51 of curved thinning cutting edge portion 43 and axis line O is large. Therefore, the length of curved thinning cutting edge portion 43 is short. Thus, the amount of change in the rake angle per length at curved thinning cutting edge portion 43 becomes large. As a result, a chip may be melted and adhered to the cutting edge. According to drill 100 of the present embodiment, the angle formed by first straight line 121 and thinning cutting edge 4 is 160° or less as viewed in axis line direction.

Therefore, the length of curved thinning cutting edge portion 43 can be suppressed from being short. As a result, a chip can be suppressed from being melted and adhered to the cutting edge.

When the axial rake angle of second straight thinning cutting edge portion 42 is more than 0°, second straight thinning cutting edge portion 42 is reduced rearward in the rotation direction by regrinding the cutting edge of drill 100. Therefore, the length of chisel 8 becomes short. This may lead to decreased strength of the central portion of drill 100. As a result, drill 100 may be broken. According to drill 100 of the present embodiment, the axial rake angle (first axial rake angle θ11) of second straight thinning cutting edge portion 42 is 0° or less in the cross section (first cross section CS1) that is perpendicular to second straight thinning cutting edge portion 42 as viewed in the axis line direction and intersects second straight thinning cutting edge portion 42. Therefore, breakage of drill 100 can be suppressed. Further, according to drill 100 of the present embodiment, first axial rake angle θ11 is −10° or more in first cross section CS1. Therefore, the cutting resistance at second straight thinning cutting edge portion 42 can be suppressed from being too large.

According to drill 100 of the present embodiment, thinning pocket wall portion 63 may be located forward with respect to thinning cutting edge 4 in the rotation direction. In the cross section (third cross section CS3) that is perpendicular to second straight line 122 as viewed in plan view direction 101 and intersects the boundary line between thinning pocket wall portion 63 and intermediate surface 62, the curvature radius (fourth curvature radius R4) of thinning pocket wall portion 63 may be 10% or more and 30% or less of the diameter (first diameter D1) of drill 100. Thus, a portion of a chip close to axis line O of drill 100 is contained in thinning pocket wall portion 63 and is caused to flow.

Therefore, the chip is likely to be divided, thus resulting in improved chip discharging characteristic of drill 100.

According to drill 100 of the present embodiment, the angle (second angle θ2) formed by the tangent (first tangent 131) of thinning rake face portion 61 at the boundary between thinning rake face portion 61 and intermediate surface 62 and the tangent (second tangent 132) of thinning pocket wall portion 63 at the boundary between thinning pocket wall portion 63 and intermediate surface 62 may be 105° or more in the cross section (third cross section CS3) that is perpendicular to second straight line 122 as viewed in plan view direction 101 and intersects the boundary line between thinning pocket wall portion 63 and intermediate surface 62. Hence, the volume of the flute constituted of thinning pocket wall portion 63 can be large. Thus, the chip discharging characteristic can be improved.

According to drill 100 of the present embodiment, main cutting edge 3 may have curved cutting edge portion 31. As viewed in the axis line direction, the curvature radius (second curvature radius R2) of curved cutting edge portion 31 may be 40% or more and 100% or less of the diameter (first diameter D1) of drill 100. Therefore, as compared with the case where main cutting edge 3 has a straight shape, the tangent of curved cutting edge portion 31 at the outer peripheral end of curved cutting edge portion 31 is greatly inclined forward in the rotation direction with respect to the straight line including axis line O and the outer peripheral end of curved cutting edge portion 31 as viewed in the axis line direction. This leads to improved cuttability of main cutting edge 3 in the vicinity of the outer peripheral end of curved cutting edge portion 31. Since second curvature radius R2 is 40% or more of first diameter D1 as viewed in the axis line direction, the strength of main cutting edge 3 in the vicinity of the outer peripheral end of curved cutting edge portion 31 can be suppressed from being decreased. Since second curvature radius R2 is 100% or less of first diameter D1 as viewed in the axis line direction, the cuttability of main cutting edge 3 can be suppressed from being decreased.

When main cutting edge 3 has a straight shape, a chip immediately after being formed has a straight shape. In this case, the chip having a straight shape is curled by curved portion 95 of second heel 92. Hence, an amount of change in shape of the chip becomes large, thus resulting in large cutting resistance. On the other hand, when main cutting edge 3 has a curved shape, a chip immediately after being formed has a curved shape. In this case, the chip having a curved shape is curled by curved portion 95 of second heel 92. Therefore, the amount of change in shape of the chip becomes small and the cutting resistance becomes small as compared with the case where main cutting edge 3 has a straight shape. According to drill 100 of the present embodiment, main cutting edge 3 may have curved cutting edge portion 31. Therefore, a chip formed by main cutting edge 3 has a curved shape. This results in reduced cutting resistance.

According to drill 100 of the present embodiment, the curvature radius (third curvature radius R3) of curved portion 95 of second heel 92 may be smaller than the curvature radius (second curvature radius R2) of curved cutting edge portion 31 of main cutting edge 3 as viewed in the axis line direction. Therefore, as the chip flows from helical flute surface 5 in the vicinity of main cutting edge 3 toward helical flute surface 5 in the vicinity of second heel 92, the curl radius of the chip becomes gradually smaller.

Drill 100 according to the present embodiment may have reinforcing cutting edge portion 32. Reinforcing cutting edge portion 32 may constitute outermost peripheral end 59. Reinforcing cutting edge portion 32 may be inclined rearward with respect to fourth straight line 124 in the rotation direction. Therefore, the strength of the cutting edge can be improved around outermost peripheral end 59 as compared with a case where reinforcing cutting edge portion 32 is not provided. As a result, even when cutting a workpiece having a hardness of HB300 or more, the cutting edge can be suppressed from being broken.

When the length of reinforcing cutting edge portion 32 is too long as viewed in the axis line direction, the cutting resistance becomes large, with the result that the thickness of the chip becomes thick. Therefore, the strength of the chip is increased, with the result that the chip strongly rubs the helical flute surface of the drill. This causes wear in drill 100 along a route in which the chip has flowed. According to drill 100 of the present embodiment, the length (second length L2) of reinforcing cutting edge portion 32 may be 2% or less of the diameter (first diameter D1) of drill 100 as viewed in the axis line direction. Therefore, the length of reinforcing cutting edge portion 32 can be suppressed from being too long. Thus, the wear of drill 100 can be suppressed.

When the length of reinforcing cutting edge portion 32 is too long, the cutting resistance of reinforcing cutting edge portion 32 becomes too large. Therefore, the amount of change in cutting resistance becomes large at the boundary between curved cutting edge portion 31 and reinforcing cutting edge portion 32. Thus, the chip is likely to be melted and adhered to the cutting edge. According to drill 100 of the present embodiment, the length (second length L2) of reinforcing cutting edge portion 32 may be 2% or less of the diameter (first diameter D1) of drill 100 as viewed in the axis line direction. Thus, the melting and adhesion of the chip to the cutting edge can be suppressed.

Example 1

(Sample Preparation)

First, drills 100 according to samples 1 to 3 were prepared. Drills 100 of samples 1 and 2 are comparative examples. Drill 100 of sample 3 is an example of the present disclosure.

In drill 100 of sample 1, first curvature radius R1 of curved thinning cutting edge portion 43 was 10% of the diameter of drill 100. In drill 100 of sample 1, second axial rake angle θ12 of curved thinning cutting edge portion 43 was 0°. The diameter (first diameter D1) of drill 100 according to each of samples 1 to 3 was 19.25 mm.

In drill 100 of sample 2, first curvature radius R1 of curved thinning cutting edge portion 43 was 10% of the diameter of drill 100. In drill 100 of sample 2, second axial rake angle θ12 of curved thinning cutting edge portion 43 was 10°.

Drill 100 of sample 3 has a thinning pocket wall portion 63. In drill 100 of sample 3, fourth curvature radius R4 of thinning pocket wall portion 63 was 15% of the diameter of drill 100. In drill 100 of sample 3, first curvature radius R1 of curved thinning cutting edge portion 43 was 25% of the diameter of drill 100. In drill 100 of sample 3, second axial rake angle θ12 of curved thinning cutting edge portion 43 was 13°.

(Evaluation Method)

Next, thrust component force of the cutting resistance was evaluated using each of drills 100 according to samples 1 to 3. Holes were formed in a workpiece using each of drills 100 according to samples 1 to 3. The workpiece was SS400. The depth of each of the holes was 40 mm. The number of the holes was three. The thrust component force of the cutting resistance was measured while forming the holes in the workpiece using each of drills 100 according to samples 1 to 3. The average value of the thrust component forces of the cutting resistance received by drill 100 when forming the three holes was found. Chips resulting from the formation of the holes were checked. A cutting speed Vc was 120 m/min. A feed amount f was 0.3 mm/rotation. Coolant was supplied by internally supplying oil.

(Evaluation Results)

Table 1 shows respective average values of thrust component forces of cutting resistances received by drills 100 during the formation of the holes using drills 100 according to samples 1 to 3. As shown in Table 1, when the holes were formed using drill 100 according to sample 3, the thrust component force of the cutting resistance received by drill 100 was smaller than the thrust component force of the cutting resistance received by drill 100 when the holes were formed using each of drills 100 according to samples 1 and 2. In view of the above results, it was proved that drill 100 of the example of the present disclosure can reduce the cutting resistance as compared with drills 100 of the comparative examples.

TABLE 1

| No. | Thrust Component Force of Cutting Resistance | |
|---|---|---|
|  | Average Value (N) | Ratio to Sample 1 (%) |
| Sample 1 | 3407 | 100 |
| Sample 2 | 3070 | 90 |
| Sample 3 | 2717 | 80 |

Figure 14:
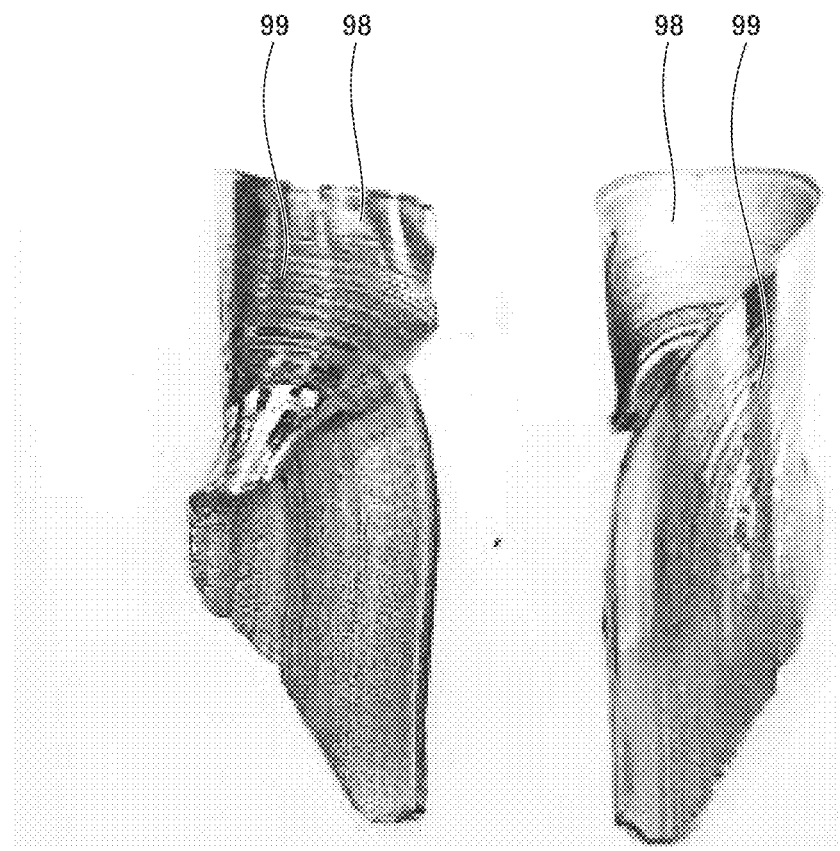
FIG. 14 shows a photograph of chips formed using a drill according to a sample 1.
Figure 15:
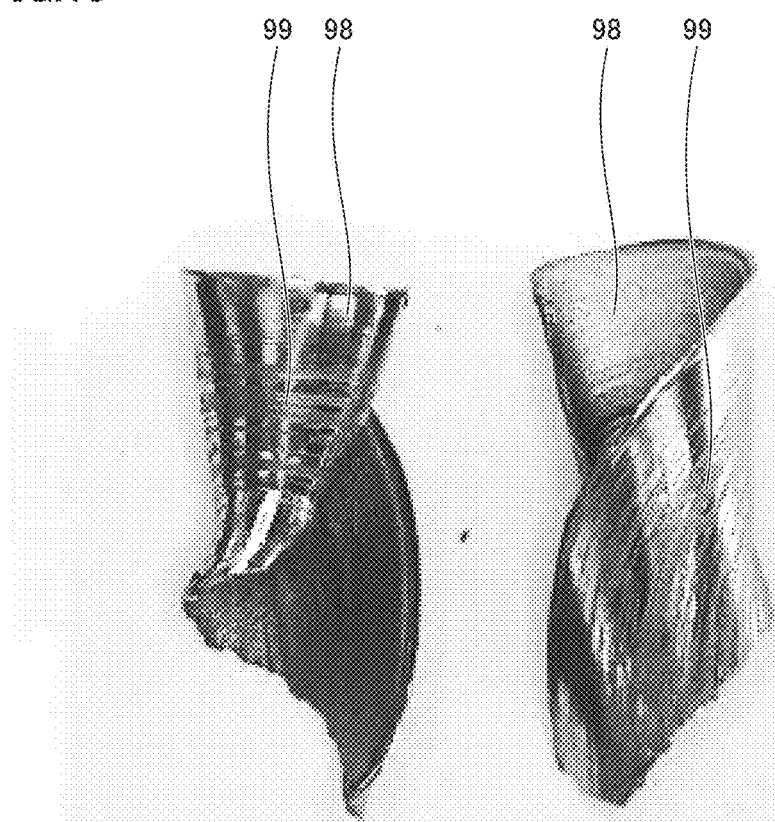
FIG. 15 shows a photograph of chips formed using a drill according to a sample 2.
Figure 16:
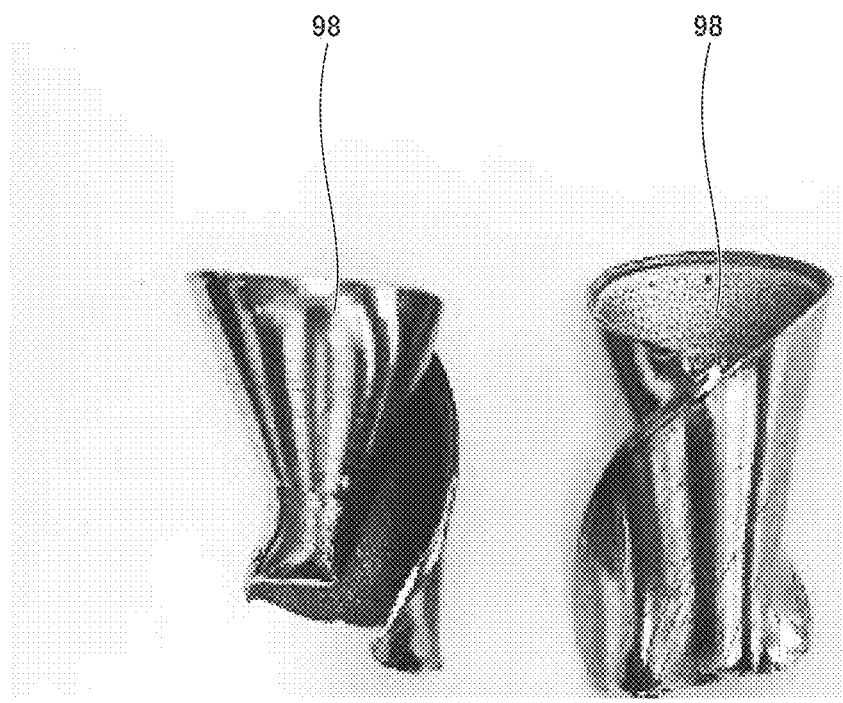
FIG. 16 shows a photograph of chips formed using a drill according to a sample 3.

FIG. 14 shows a photograph of chips formed using drill 100 according to sample 1. FIG. 15 shows a photograph of chips formed using drill 100 according to sample 2. FIG. 16 shows a photograph of chips formed using drill 100 according to sample 3. As shown in FIGS. 14, 15 and 16, on a surface of each of chips 98 formed by drills 100 according to samples 1 and 2, scratches 99 were formed along a direction of flow of chip 98. It is considered that scratches 99 are formed as follows: a chip melted and adhered to the cutting edge is brought into contact with a newly formed chip. Therefore, it is considered that the melting and adhesion of the chip to the cutting edge has occurred in each of drills 100 according to samples 1 and 2. On the other hand, on a surface of chip 98 formed by drill 100 according to sample 3, substantially no scratch 99 was formed along the direction of flow of chip 98. In view of this, it was proved that with drill 100 of the example of the present disclosure, the melting and adhesion of the chip to the cutting edge can be suppressed as compared with drills 100 of the comparative examples.

As shown in FIGS. 14, 15 and 16, the length of chip 98 formed by drill 100 according to sample 3 was shorter than the length of chip 98 formed by drill 100 according to each of samples 1 and 2. In view of this, it was proved that with drill 100 of the example of the present disclosure, the chip discharging characteristic can be improved as compared with drills 100 of the comparative examples.

Example 2

(Evaluation Method)

Next, each of drills 100 according to samples 1 to 3 was used to evaluate the chip discharging characteristic under a low feed condition. A workpiece was SS400. The depth of each hole was 40 mm. Chips resulting from the formation of the holes were checked. A cutting speed Vc was 120 m/min. A feed amount f was 0.2 mm/rotation. Coolant was supplied by internally supplying oil.

(Evaluation Results)

Figure 17:
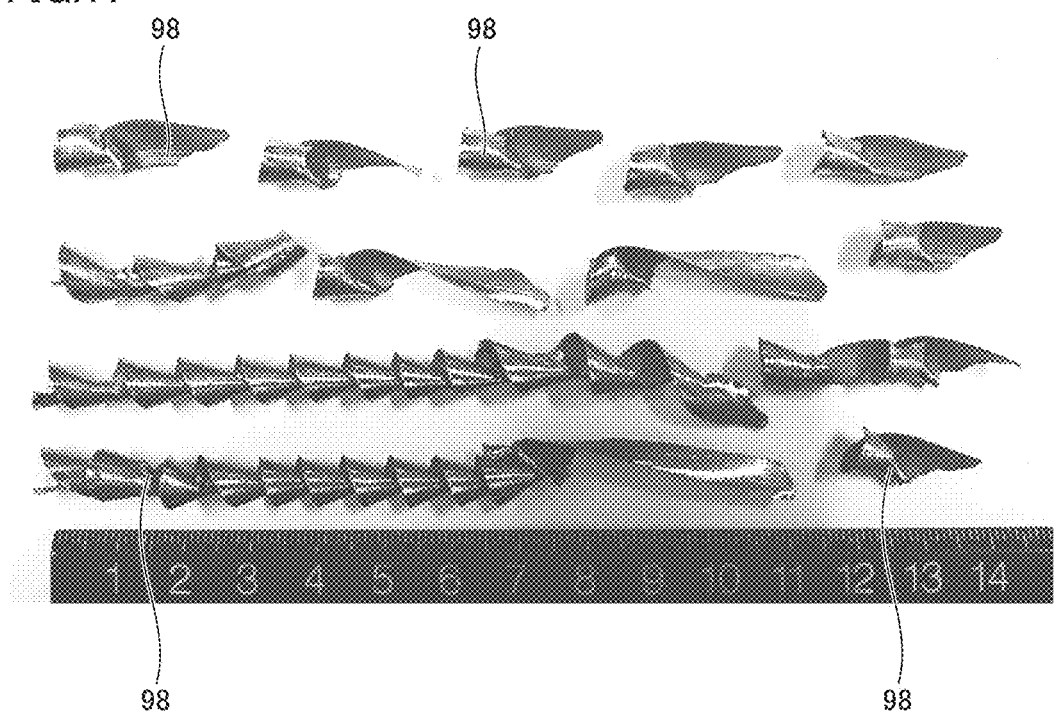
FIG. 17 shows a photograph of chips formed using the drill according to sample 1 under a low feed condition.
Figure 18:
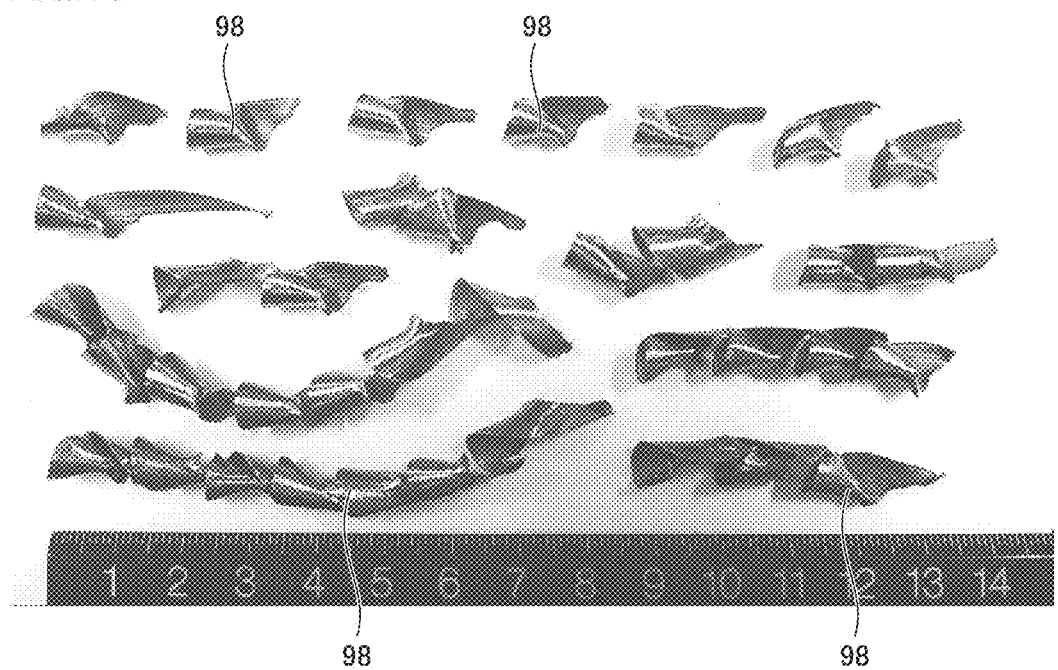
FIG. 18 shows a photograph of chips formed using the drill according to sample 2 under the low feed condition.
Figure 19:
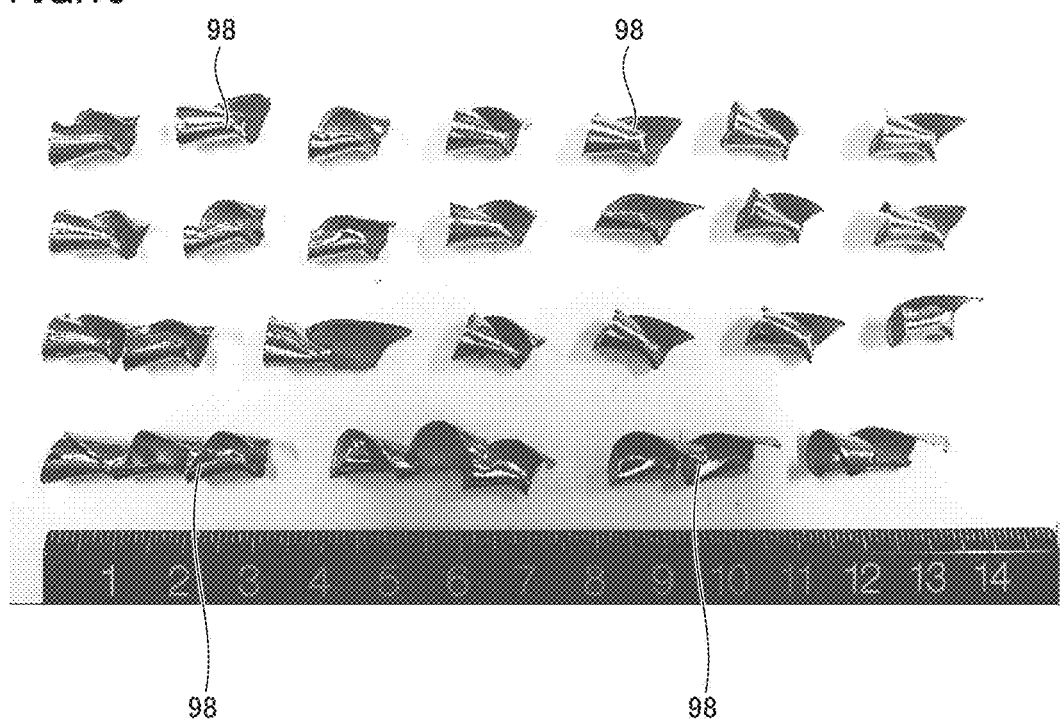
FIG. 19 shows a photograph of chips formed using the drill according to sample 3 under the low feed condition.

FIG. 17 shows a photograph of chips formed using drill 100 according to sample 1 under the low feed condition. FIG. 18 shows a photograph of chips formed using drill 100 according to sample 2 under the low feed condition. FIG. 19 shows a photograph of chips formed using drill 100 according to sample 3 under the low feed condition. As shown in FIGS. 17 and 18, chips 98 formed by each of drills 100 according to samples 1 and 2 included chips 98 each having a length of 50 mm or more. On the other hand, as shown in FIG. 19, the length of each of chips 98 formed by drill 100 according to sample 3 was 50 mm or less. In view of this, it was proved that with drill 100 of the example of the present disclosure, the chip discharging characteristic can be improved as compared with drills 100 of the comparative examples.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: front end; 2: rear end; 3: main cutting edge; 4: thinning cutting edge; 5: helical flute surface; 6: thinning face; 7: leading edge; 8: chisel; 9: outer peripheral surface; 10: first flank face; 11: first flank face portion; 12: second flank face portion; 15: first boundary line; 17: shank; 19: first outer peripheral surface portion; 20: second flank face; 23: third flank face portion; 24: fourth flank face portion; 25: second boundary line; 29: second outer peripheral surface portion; 31: curved cutting edge portion; 32: reinforcing cutting edge portion; 39: reinforcing rake face; 41: first straight thinning cutting edge portion; 42: second straight thinning cutting edge portion; 43: curved thinning cutting edge portion; 51: first end portion; 52: second end portion; 55: outer peripheral position; 57: second boundary point; 58: first boundary point; 59: outermost peripheral end; 61: thinning rake face portion; 62: intermediate surface; 63: thinning pocket wall portion; 81: first portion; 82: second portion; 83: third portion; 91: first heel; 92: second heel; 93: heel inner peripheral portion; 94: heel intermediate portion; 95: curved portion; 96: heel outer peripheral portion; 98: chip; 99: scratch; 100: drill; 101: plan view direction; 121: first straight line; 122: second straight line; 123: third straight line; 124: fourth straight line; 125: fifth straight line; 126: sixth straight line; 127: seventh straight line; 131: first tangent; 132: second tangent; CS1: first cross section; CS2: second cross section; CS3: third cross section; D1: first diameter; D2: second diameter; E0: reference distance; E1: first distance; E2: second distance; E3: third distance; E4: fourth distance; F: outer peripheral core height; H: maximum distance; IV, VIII, XIII: region; L1: first length; L2: second length; O: axis line; R1: first curvature radius; R2: second curvature radius; R3: third curvature radius; R4: fourth curvature radius; θ1: first angle; θ2: second angle; θ3: third angle; θ11: first axial rake angle; θ12: second axial rake angle; θ13: third axial rake angle; θ14: fourth axial rake angle; θ21: first central angle; δ22: second central angle.

The invention claimed is:

1. A drill rotatable around an axis line, the drill comprising:
   a helical flute surface helically provided around the axis line;
   a flank face contiguous to the helical flute surface; and
   a thinning face contiguous to each of the helical flute surface and the flank face, wherein
   a ridgeline between the helical flute surface and the flank face constitutes a main cutting edge,
   a ridgeline between the thinning face and the flank face constitutes a thinning cutting edge contiguous to the main cutting edge,
   as viewed in an axis line direction along the axis line, the thinning cutting edge is close to the axis line with respect to the main cutting edge,
   the thinning cutting edge includes
      a curved thinning cutting edge portion that protrudes forward in a rotation direction, and
      a straight thinning cutting edge portion that is contiguous to the curved thinning cutting edge portion and that is close to the axis line with respect to the curved thinning cutting edge portion as viewed in the axis line direction,
   when a first straight line is defined as a straight line passing through the axis line and an outer peripheral position separated rearward in the rotation direction from an outermost peripheral end of the main cutting edge by a predetermined outer peripheral core height,
   an angle formed by the first straight line and the straight thinning cutting edge portion is 135° or more and 160° or less as viewed in the axis line direction,
   a length of the straight thinning cutting edge portion is 10% or less of a diameter of the drill as viewed in the axis line direction,
   an axial rake angle of the straight thinning cutting edge portion is −10° or more and 0° or less in a cross section that is perpendicular to the straight thinning cutting edge portion as viewed in the axis line direction and intersects the straight thinning cutting edge portion,
   the curved thinning cutting edge portion has a first end portion that is a boundary between the curved thinning cutting edge portion and the straight thinning cutting edge portion, and a second end portion opposite to the first end portion,
   an axial rake angle of the curved thinning cutting edge portion in a cross section perpendicular to the tangent of the curved thinning cutting edge portion as viewed in the axis line direction is larger in a direction further away from the first end portion,
   the axial rake angle of the curved thinning cutting edge portion is 5° or more and 20° or less in a cross section that is perpendicular to the tangent of the curved thinning cutting edge portion at the second end portion as viewed in the axis line direction and includes the second end portion, and
   a curvature radius of the curved thinning cutting edge portion is 15% or more and 35% or less of the diameter of the drill as viewed in the axis line direction.

2. The drill according to claim 1, wherein
   the thinning face includes
      a thinning rake face portion contiguous to each of the helical flute surface and the flank face;
      a thinning pocket wall portion located forward with respect to the thinning cutting edge in the rotation direction, and
      an intermediate surface contiguous to each of the thinning rake face portion and the thinning pocket wall portion,
   the flank face includes
      a first flank face portion that is contiguous to each of the helical flute surface and the thinning face, and
      a second flank face portion that is contiguous to the first flank face portion and that is located rearward with respect to the first flank face portion in the rotation direction,
   when a second straight line is defined as a straight line along a boundary line between the thinning pocket wall portion and the intermediate surface and a plan view direction is defined as a direction that is along a direction perpendicular to a ridgeline between the first flank face portion and the second flank face portion and extends inward in a radial direction as viewed in the axis line direction,
   in a cross section that is perpendicular to the second straight line as viewed in the plan view direction and intersects the boundary line between the thinning pocket wall portion and the intermediate surface,
   the thinning pocket wall portion has a curved shape,
   a curvature radius of the thinning pocket wall portion is 10% or more and 30% or less of the diameter of the drill, and
   an angle formed by a tangent of the thinning rake face portion at a boundary between the thinning rake face portion and the intermediate surface and a tangent of the thinning pocket wall portion at a boundary between the thinning pocket wall portion and the intermediate surface is 105° or more and 125° or less.

3. The drill according to claim 1, wherein
   the main cutting edge includes a curved cutting edge portion recessed rearward in the rotation direction,
   a curvature radius of the curved cutting edge portion is 40% or more and 100% or less of the diameter of the drill as viewed in the axis line direction,
   a maximum distance between the curved cutting edge portion and a third straight line that passes through an outer peripheral end of the curved cutting edge portion and is parallel to the first straight line is 0.5% or more and 4% or less of the diameter of the drill as viewed in the axis line direction,
   the thinning face constitutes a first heel contiguous to the thinning cutting edge,
   the first heel is located forward with respect to the thinning cutting edge in the rotation direction,
   the helical flute surface constitutes a second heel contiguous to the first heel,
   the second heel is located forward with respect to the main cutting edge in the rotation direction,
   the second heel includes a curved portion recessed forward in the rotation direction,
   a curvature radius of the curved portion is 15% or more and 25% or less of the diameter of the drill as viewed in the axis line direction, and
   in a cross section perpendicular to the axis line, a central angle of the helical flute surface is 0.55 time or more and 1.0 time or less as large as a central angle of a portion other than the helical flute surface.

4. The drill according to claim 3, wherein
   the main cutting edge includes a reinforcing cutting edge portion that is contiguous to the curved cutting edge portion and that constitutes the outermost peripheral end, and when a fourth line is defined as a straight line including the axis line and a boundary between the curved cutting edge portion and the reinforcing cutting edge portion as viewed in the axis line direction, the reinforcing cutting edge portion is inclined rearward with respect to the fourth straight line in the rotation direction as viewed in the axis line direction, an angle formed by the reinforcing cutting edge portion and the fourth straight line is 15° or more and 30° or less as viewed in the axis line direction, and a length of the reinforcing cutting edge portion is 1% or more and 2% or less of the diameter of the drill as viewed in the axis line direction.

* * * * *